United States Patent
List et al.

(10) Patent No.: US 10,035,515 B2
(45) Date of Patent: Jul. 31, 2018

(54) SYSTEM AND METHOD FOR ANALYZING THE ENERGY EFFICIENCY OF A MOTOR VEHICLE, IN PARTICULAR OF AN APPARATUS OF THE MOTOR VEHICLE

(71) Applicant: AVL LIST GMBH, Graz (AT)

(72) Inventors: Helmut List, Graz (AT); Peter Schoeggl, Hitzendorf (AT); Guenter Karl Fraidl, Graz (AT); Erik Bogner, Graz (AT); Mario Oswald, Fernitz (AT); Paul Kapus, Judendorf (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 15/307,492

(22) PCT Filed: Apr. 30, 2015

(86) PCT No.: PCT/EP2015/059545
§ 371 (c)(1),
(2) Date: Oct. 28, 2016

(87) PCT Pub. No.: WO2015/166064
PCT Pub. Date: Nov. 5, 2015

(65) Prior Publication Data
US 2017/0050644 A1    Feb. 23, 2017

(30) Foreign Application Priority Data

Apr. 30, 2014  (DE) .................. 10 2014 006 321

(51) Int. Cl.
*G01M 17/00*    (2006.01)
*B60W 50/14*    (2012.01)
*B60W 40/12*    (2012.01)

(52) U.S. Cl.
CPC ............ *B60W 40/12* (2013.01); *B60W 50/14* (2013.01); *B60W 2050/146* (2013.01);
(Continued)

(58) Field of Classification Search
CPC .... G01M 17/007; G01M 17/00; B60W 50/14; B60W 4/02; B60W 40/12
(Continued)

(56) References Cited

U.S. PATENT DOCUMENTS 8,108,094 B2 *  1/2012  Hori .................. F02D 35/023
                                                        340/438
8,571,748 B2   10/2013  Kluge et al.
(Continued)

FOREIGN PATENT DOCUMENTS

DE        102 36 620 A1    2/2004
DE    10 2009 048 615 A1    6/2010
(Continued)

OTHER PUBLICATIONS

International Preliminary Report on Patentability for International (PCT) Patent Application No. PCT/EP2015/059545, dated Nov. 10, 2016, 10 pages.
(Continued)

*Primary Examiner* — Tan Q Nguyen
(74) *Attorney, Agent, or Firm* — Sheridan Ross P.C.

(57) ABSTRACT

The invention relates to a system (1) for analyzing an energy efficiency of a motor vehicle (2), having: a first device (4a, 4b), in particular a sensor, configured to detect a first data set of at least one first parameter, which is suitable to characterize energy consumed by at least one apparatus A, in particular a steering system or drive device (3); a second device (5a, 5b, 5c, 5d), in particular a sensor, configured to detect a second data set of at least one second parameter, which is suitable to characterize an operating state of the at least one apparatus A; a third device (6), configured to detect a third data set of at least one third parameter, which is suitable to characterize at least one driving state of the vehicle (2); a first comparison device (7), in particular part of a data processing device, configured to compare the values of the second data set with predefined parameter ranges which correspond to at least one operating state, and to compare the values of the third data set with predefined parameter ranges which correspond to at least one driving state; an allocation device (8), in particular part of the
(Continued)

Figure 1:
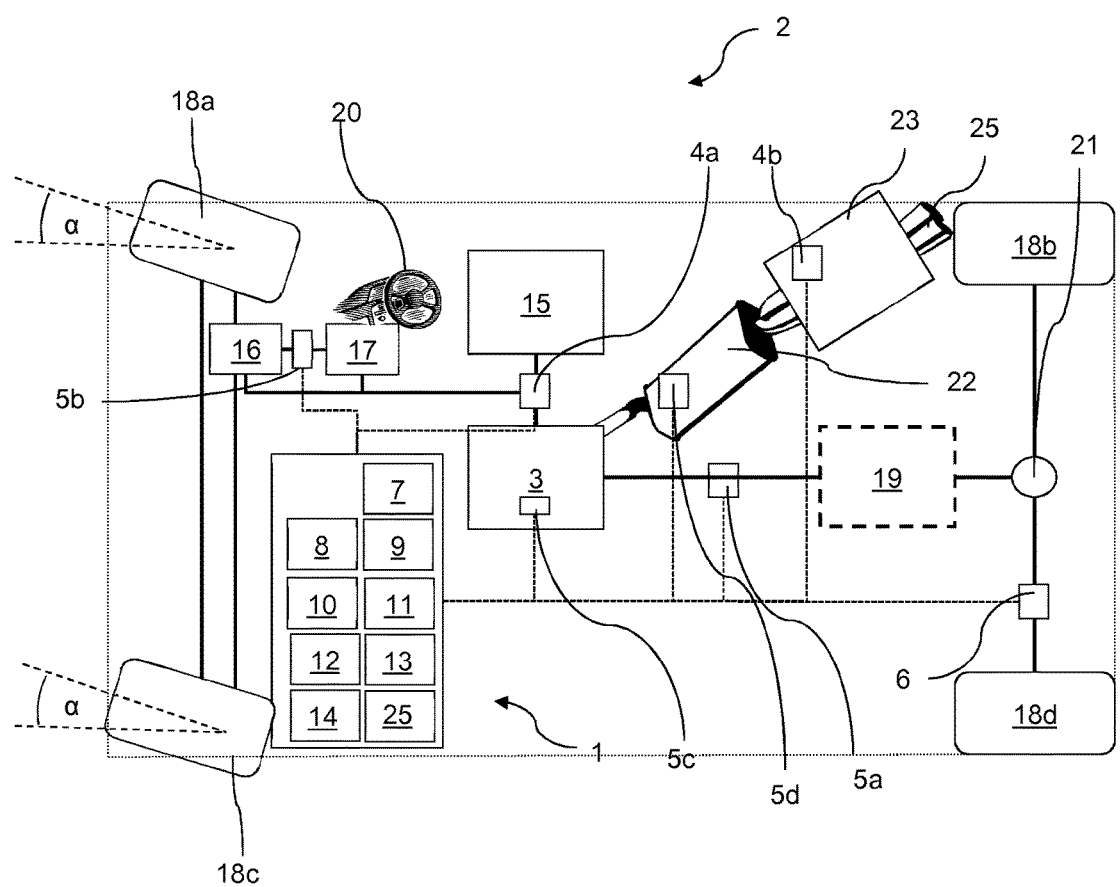

data-processing device, configured to allocate the values of the first data set and the values of the second data set to the respectively present at least one driving state; and a processing device (9), in particular part of the data-processing device, configured to determine at least one first characteristic value which characterizes at least the energy efficiency of the at least one apparatus A on the basis of the first data set and the second data set as a function of the at least one driving state.

22 Claims, 15 Drawing Sheets

(52) U.S. Cl.
CPC ..... *B60W 2510/20* (2013.01); *B60W 2510/30* (2013.01); *B60W 2510/305* (2013.01)

(58) Field of Classification Search
USPC .......................................... 701/123, 108, 109
See application file for complete search history.

(56) References Cited

U.S. PATENT DOCUMENTS

| | | | | |
|---|---|---|---|---|
| 2007/0056185 | A1* | 3/2007 | Isono | B60W 10/26 34/493 |
| 2007/0112475 | A1* | 5/2007 | Koebler | B60L 3/12 701/1 |
| 2008/0039996 | A1 | 2/2008 | Lee | |
| 2013/0268152 | A1* | 10/2013 | Koshizen | B60L 15/2045 701/22 |

FOREIGN PATENT DOCUMENTS

| | | |
|---|---|---|
| DE | 10 2010 026545 A1 | 4/2011 |
| EP | 1 672 348 A1 | 6/2006 |

OTHER PUBLICATIONS

International Search Report prepared by the European Patent Office dated Sep. 10, 2015, for International Application No. PCT/EP2015/059545.

Search Report prepared by the German Patent Office dated Feb. 6, 2015, for German Application No. 10 2014 006 321.6.

Jan Strehlow: "Nr. 11—Neuer Europäischer Fahrzylkus", Jun. 30, 2013, XP002743107, Retrieved from the Internet: URL: http://www.automotivetechfeed.files.wordpress.com/2013/06/nr-11-neuer-europc3a4ischer-fahrzyklus.pdf.

Gero Baumann et al: "Analyse des fahrereinflusses auf den Energieverbrauch von konventionallen und Hybridfahrzeugen mittels Fahrversuch und interaktiver Simulation", Internet Citation, Nov. 17, 2010 (Nov. 17, 2010), XP002743109, Retrieved from the Internet: URL: http://www.fkfs.de/uploads/publikationen/Baumann_VDI_SIMVEC_2010_Fahrereinfluss_Energieverbrauch.pdf.

\* cited by examiner

SYSTEM AND METHOD FOR ANALYZING THE ENERGY EFFICIENCY OF A MOTOR VEHICLE, IN PARTICULAR OF AN APPARATUS OF THE MOTOR VEHICLE

CROSS REFERENCE TO RELATED APPLICATIONS

This application is a national stage application under 35 U.S.C. 371 and claims the benefit of PCT Application No. PCT/EP2015/059545 having an international filing date of 30 Apr. 2015, which designated the U.S., which PCT application claimed the benefit of German Patent Application No. 10 2014 006 321.6 filed 30 Apr. 2014, the disclosure of each of which are incorporated herein by reference in their entireties.

The invention relates to a system and a method for the evaluation and/or optimization of an energy efficiency of a motor vehicle.

Motor vehicle energy efficiency is increasingly gaining in importance, both as a selling point for customers against the backdrop of increasing energy costs as well as for legislators against the backdrop of needing to reduce vehicle environmental pollution in the context of climate protection objectives.

On the consumer side, the overall total costs of vehicle ownership is also becoming increasingly important. In terms of the purely technical aspects, CO2 legislation certainly represents the most substantial technology driver. Future CO2 and/or fuel economy fleet limits are globally converging to continuously reducing levels. On the one hand, this necessitates complex drive systems with highly versatile components but, on the other hand, it also requires heightened individualized adaptation to very different boundary conditions, resulting in multi-dimensional diversification of the drive systems (different energy sources, different degrees of electrification, high diversity, etc.).

In the future, the integrating of the vehicle's powertrain into the overall vehicle environment (i.e. connected powertrain) will also allow for optimally adapting control strategies to the real-world traffic and environmental conditions, in particular the topography. The abundance of information from in-vehicle infotainment and driver assistance systems to vehicle-to-vehicle communication (Car2Car) or vehicle-to-X communication (Car2X) enables the calculating of many scenarios in advance and thus vastly expanding the optimization horizon. There is thus the possibility of utilizing the wide flexibility of future drive systems to a substantially higher degree to reduce energy consumption. However, this requires highly complex control strategies with dramatically increased development, calibration and, above all, validation expenditures.

In order to give consumers a point of reference with respect to energy efficiency, the regulation on identifying passenger car CO2 emissions has been in force in the Federal Republic of Germany since Dec. 1, 2011. Since then, any vehicle on display or offered for sale or lease must display the associated CO2 label identifying its energy efficiency class. For vehicles, this classification is based on the vehicle's weight. There is thereby a direct connection between a vehicle's energy efficiency and its emissions.

In order to classify vehicles into energy efficiency classes, the reference value for the CO2 emission is determined, at the time of application, based on the vehicle weight. In contrast, information on how much of the energy that goes into effecting the forward movement of a vehicle is used efficiently and how much the individual apparatus A of the vehicle such as the powertrain, steering, drive device or even the auxiliary equipment or other influencing factors contribute to the energy efficiency cannot be deduced from the classification into an energy efficiency class.

Emissions are also subject to ever stricter legal regulations. The European Community's first uniform emission standards came into force in 1970. At that time, only carbon monoxide and hydrocarbon emissions were limited. Nitrogen oxide was introduced as an additionally restricted exhaust emission in 1977. Limit values on particulate matter (soot) from diesel engines were introduced in 1988. Europe-wide limit values on exhaust emissions for commercial vehicles and buses were first established in 1988. Europe-wide exhaust limits have been in place for motorcycles and mopeds since 1997.

Exhaust regulations have gradually intensified ever since. The strictness here pertains to the type and amount of emission values and the continuing compliance with same.

Consumption and emission value testing to the regulatory standards are tested in a likewise standardized driving cycle. This has been the accepted method for decades for determining emissions during approval testing of vehicles on the test bed. In a laboratory environment with clear underlying temperature, fuel, test cycle and/or route profile conditions, the engines and vehicles are optimized in terms of minimum exhaust emissions and fuel consumption. With improved combustion processes and utilization of appropriate exhaust gas treatment, the values remain below all the legal emission limits at the time of application. The current New European Driving Cycle at the time of application lasts a total of 1180 seconds (just under 20 minutes). It consists of an Urban cycle (urban conditions) lasting for 780 seconds and an Extra-urban cycle (inter-urban conditions) lasting for 400 seconds. The ambient temperature during the test is 20° C. to 30° C. Cold-start conditions, acceleration and lag are determined and interpolated accordingly.

The evaluation of consumption and emissions on the basis of the standardized driving cycle represents an averaged profile enabling comparison of different vehicles. The driving cycles usually only partly correspond to the individual customer usage profiles, particularly when a customer regularly drives in heavy city traffic or only for short distances. The process also does not measure, and thus does not incorporate into the average calculation, consumption or emissions at speeds greater than 120 km/h. During a driving cycle, the search for causes of increased emissions strives for an optimization of the entire cycle.

DE 10 2009 048 615 A1 relates to a method for the electronic configuration of motor vehicles, wherein
- a route-dependent driving profile is determined for the vehicle to be configured,
- the expected energy influences on the vehicle are simulated and quantified based on the driving profile,
- separate, mutually compatible function blocks of the vehicle are determined dependent on the energy influences expected in the vehicle, wherein the function blocks in particular characterize energy properties of a component contained within the respective function block,
- the separate function blocks are compiled and a driving profile-dependent total or partial energy balance is generated,
- individual function blocks for the optimization of the total/partial driving profile-dependent energy balance and/or the creating of variants are exchanged or replaced until an energy-efficient vehicle results for the desired driving profile.

US 2008/039996 A1 relates to a system for detecting failure of a steering angle sensor in an electronic steering apparatus, wherein the system comprises:

a steering angle sensor for generating and transmitting a steering angle of the signal by measuring a rotational angle of the steering wheel, a motor for generating auxiliary power for smooth steering and transmitting a current and a voltage based on the rotation of the motor; and an electronic control unit for receiving the current and the voltage from the motor which detects the rotational direction of the motor, receives the steering angle signal from the steering angle sensor, detects a first rotational direction of the steering wheel and then, when the rotational direction of the motor is not equal to the first rotational direction of the steering wheel, determines that the steering angle signal has a failing and starts operation of a fail-safe logic.

US 2007/01 12475 A1 relates to a device for managing a motor vehicle's power consumption comprising a power management logic which is suited to calculating an applied power for the vehicle engine based on information on the vehicle's environment, information on the operating status of the vehicle, one or more control inputs and one or more operating parameters of the vehicle.

U.S. Pat. No. 8,571,748 B2 relates to a method for estimating a propulsion-related operating parameter of a vehicle for a road segment, wherein the method comprises:

estimating at least one operating parameter of the vehicle for the road segment based on information on said road segment;

estimating the propulsion-related operating parameter for the road segment using the at least one estimated operating parameter and at least one vehicle-specific parameter, wherein the at least one vehicle-specific parameter is determined by:

acquiring driving data to determine a plurality of vehicle operating parameters while the vehicle is in operation;

using at least two of the determined vehicle operating parameters in a predetermined relationship which includes the at least one vehicle-specific parameter; and determining the at least one vehicle-specific parameter from the driving data for the at least two vehicle operating parameters and the relationship, identifying different driving phases in the driving data acquired on the plurality of vehicle operating parameters, wherein at least one vehicle-specific parameter is determined for the driving phases, wherein each identified driving phase is associated with a set of vehicle-specific parameters determined from the respective driving data, wherein the vehicle-specific parameters determined for all the driving phases identified are used to estimate the propulsion-related operating parameter.

One task of the invention is providing a system and a method which enables a generally applicable analysis of a motor vehicle's energy efficiency. In particular, the analysis should not be dependent on, or only to a minor extent, the vehicle weight or the driving cycle as driven.

This task is solved by a system in accordance with claim 1 for analyzing a motor vehicle's energy efficiency and by a corresponding method in accordance with claim 6. Advantageous embodiments of the inventive teaching are claimed in the subclaims.

The invention is based in particular on the approach of segmenting complex driving processes into separate driving elements and/or driving states or sequences of driving states and determining a characteristic value on the basis of the segmentation. The segmenting enables determining the influence that the single driving elements and/or driving states have on the vehicle's energy efficiency. The characteristic value based on the segmentation is independent of driving cycles and can thus be deemed a generally applicable characteristic value of the energy efficiency. Any driving profile can be reproduced from the characteristic energy efficiency values for single driving states and the energy efficiency for any, in particular a stochastic, driving profile corresponding to actual travel (real-drive) reconstructed. The applicant has determined that significant efficiency improvements for vehicles can be achieved by means of such a segmented analysis of the vehicle's energy efficiency when optimization is based on one or more such characteristic value(s).

The invention is further based on the approach of allocating a respective separate energy efficiency to each individual apparatus A of a vehicle whether formed as a module, component or even assembly. This categorizing of the energy efficiency of the entire vehicle into the energy efficiency of individual vehicle elements can on the one hand be used to optimize the operation strategy of individual vehicle elements as a function of the vehicle's driving dynamics. On the other hand, vehicle elements with poor energy efficiency can be identified and replaced as necessary. The categorization further enables analyzing the influence various vehicle elements; i.e. different apparatus of the vehicle, have on the reciprocative energy efficiency. This is particularly important in the case of those apparatus with their energy output E(out) passing on to another apparatus as incoming energy E(in).

A further advantage of the classification lies in being able to divide a vehicle into vehicle elements in terms of energy efficiency, each able to be characterized by a manageable number of parameters, similar to the finite element method. By doing so, the vehicle as a whole can be simulated particularly accurately in terms of energy efficiency. This enables a considerable reduction in development time as changes to the design of vehicle apparatus can be analyzed in terms of their influence on the vehicle's overall energy efficiency. By enabling energy efficiency analysis using vehicle simulation, validation tests can be moved from the test bed to fully or partially simulated processes of the development process, so-called front-loading.

When sufficient parameters have been accordingly considered, the combination of segmentation and categorization allows the energy efficiency of a vehicle component to be disassociated not only from the respective driving cycle driven but also from the respective vehicle in which it is installed.

Determining such generally applicable characteristic values enables individual vehicle components and/or apparatus to be compared across different types of vehicles and driving cycles. Determining a generally applicable characteristic value can thereby ensue, e.g. for vehicle certification, during actual vehicle operation independent of specific driving cycle. This leads to a substantially better comparability of vehicles of different vehicle classes and to results which better represent consumption in actual traffic. Moreover, the controllable testing area of the test bed is broadened by the partly stochastic road travel component such that the synthesized test cycle can be supplemented by random real-world operation with a vast number of different driving elements and/or driving states and boundary conditions.

Consumption, emissions and thus the efficiency can be inventively analyzed with respect to individual driving states, a plurality of similar driving states and/or successions of different driving states of the vehicle so as to reveal the influences of driving states on the energy efficiency and the vehicle's operating behavior.

A drive device within the meaning of the invention is designed to convert energy in order to generate mechanical propulsion.

The term "acquire" within the meaning of the invention includes importing data sets produced in particular by simulations, simulating an operating state of a vehicle power unit and/or taking measurements on a vehicle or on a test bed.

As defined by the invention, an operating state of an apparatus is characterized by operating parameters. In the case of an internal combustion engine, these are typically torque and rotational speed. An operating state can in particular, however, also denote only an activation or deactivation of an apparatus. Preferably, the work/power or energy which the apparatus provides can be determined from the at least one operating state.

Within the meaning of the invention, a driving state is defined by a value or a plurality of values of a parameter or a combination or plurality of combinations of values of multiple parameters, depending on whether the driving state is considered situational (for example, during cornering) or whether a driving state only evolves from a parameter over time (for example, upon tip-in). A driving state within the meaning of the invention in particular reflects the vehicle's driving dynamics. Driving states are in particular rolling at constant speed, acceleration, cornering, parking, straight-line driving, idling (coasting), tip-in (sudden depression of acceleration), let-off (sudden release of acceleration), constant speed, shifting, standstill, ascending, descending, electric powered, recuperative braking, mechanical braking, or also a combination of at least two of these driving states. With some of the driving states, driving dynamics is also determined by the type of drive or by the operating state of vehicle components. Hence, in the case of a full hybrid vehicle, three different tip-in driving states are in principle possible, a tip-in driven by the internal combustion engine, a tip-in driven by the electric motor, and a tip-in in which the electric motor is used as added electric boost. Single driving states can be refined down to consideration of separate combinations such that tip-ins in different gears or of different output speeds, for example, can also be distinguished as different driving states.

Driving resistance as defined by the invention denotes that sum total of the resistances which a ground vehicle needs to overcome by way of propulsion in order to travel a horizontal or inclined plane at a constant or accelerating speed. The components of driving resistance are in particular aerodynamic drag, rolling resistance, climbing resistance and/or acceleration resistance.

Topography in the sense of the invention is a terrain and indicates in particular the inclination of the road surface, the curving of a road, and altitude above sea level.

As defined by the invention, an apparatus A of a vehicle is a structural element, particularly auxiliary equipment, a component, particularly power electronics, or a drive device or a system, particularly a steering system or powertrain.

A driving element in the terms of the invention is preferably a driving state. Further preferably, the development of additional parameters which characterize the initially specified criteria can be taken into account in the identifying of a driving element. It is thereby for example conceivable for an increase of the first parameter, which characterizes the vehicle's energy consumption, to indicate a particularly relevant driving element for the energy consumption and thus for the energy efficiency.

Real-drive within the meaning of the invention means actual vehicle operation, particularly on the road or over terrain. In the case of semi-simulated or fully simulated vehicles, real-drive can also denote the representation of such actual travel on a test bed, for example via stochastic methods. Real-drive emissions are accordingly produced during (simulated) real travel; real-drive efficiency is the energy efficiency of the vehicle during (simulated) real vehicle operation.

In one advantageous embodiment of the system according to the invention, the at least one first parameter furthermore characterizes energy consumption of at least one further apparatus B, the at least one second parameter furthermore characterizes an operating state of the at least one further apparatus B, and the processing device is further configured to determine at least one second characteristic value which characterizes at least the energy efficiency of the at least one further apparatus B on the basis of the first data set and the second data set as a function of the at least one driving state, and the processing device is further configured to consolidate the at least one first characteristic value characterizing at least the energy efficiency of the at least one apparatus A and the at least one second characteristic value characterizing at least the energy efficiency of the at least one further apparatus B for the respectively same driving state into one collective characteristic value characterizing an energy efficiency of the system of the at least two apparatus A and B.

By consolidating characteristic values of one apparatus A and one apparatus B into a total characteristic value, successively higher-level systems of the vehicle can be formed based on the individual components of the vehicle. Energy efficiency can thus be composed of the smallest to the largest unit of the vehicle.

In a further embodiment, the total characteristic value reflects the energy efficiency of for example a powertrain, a steering system or the entire vehicle. Alternatively hereto, individual evaluations, as are described in the following advantageous embodiment, can also be consolidated into one total evaluation.

In a further advantageous embodiment, the inventive system comprises a fourth device, particularly an interface, designed to acquire a target value for the at least one characteristic value, particularly on the basis of a vehicle model or a reference vehicle, and further comprises a second comparison device, particularly part of a data processing device, designed to compare the characteristic value to the target value, and an output device, particularly a display, designed to output an evaluation on the basis of the comparison.

Different apparatus of the same type or also different systems or even vehicles can be readily compared to one another on the basis of the energy efficiency evaluation. The evaluation is thereby preferably expressed as a type of energy efficiency class.

In a further advantageous embodiment of the inventive system, same further comprises a storage device designed to store a succession of driving states and the processing device is further designed to factor in the succession of driving states when determining the characteristic value.

Target values or target value functions respectively can result in accordance with the invention both from a comparison to a reference vehicle as well as from a comparison to a statistically selected result of multiple comparison vehicles. A statistical evaluation can hereby in particular ensue on the basis of regression analysis or even a simple mean value determination. Tolerance ranges can be specified for the target values or target value functions in an evaluation. Preferably, only one profile of at least two singular driving elements and/or driving states can also be of significant relevance for a criterion (e.g. a tip-in after a long overrun phase for the driveability criterion).

This realization of the inventive system enables not only determining values on the basis of single driving elements, particularly driving states, but also allows for factoring in the influence which preceding and/or subsequent driving states have on the current driving states to be evaluated. Additionally, characteristic values can also be determined over measuring periods encompassing multiple driving states, wherein the respective parameters used for the analysis can be consolidated or integrated over these periods. Preferably, all the data sets can hereby be stored so that an analysis can be run not only in online operation but also in offline operation. A floating evaluation window can hereby be defined for the analysis of the stored values, with which single driving elements and/or driving states can be subdivided into smaller units. A statistical evaluation of the target value deviation during individual driving states or over a plurality of driving states of same type is also possible in an overall assessment. An energy efficiency-relevant event is thereby preferably determined from the frequency and magnitude of deviation from the target value. Thus, both smaller deviations of higher frequency as well as large deviations of lesser frequency can be classified as relevant.

In one further advantageous embodiment of the inventive system, the processing device is furthermore designed to adjust an allocation of the values of the first data set and the second data set to the at least one defined driving state so as to take into account signal propagation delay and/or elapsed time from at least one measuring medium for acquiring the respective data set to a sensor.

This embodiment of the inventive system can prevent determined or measured values from being allocated to the wrong driving states or, respectively, elements being incorrectly identified.

The aspects of the invention described above and the features disclosed with respect to the further development of the inventive system also apply analogously to the aspects of the invention described below and the associated further development of the inventive method and vice versa.

In one advantageous embodiment, the inventive method further comprises the following procedural steps: acquiring a target value for the at least one characteristic value, particularly on the basis of a vehicle model or a reference vehicle, comparing the characteristic value to the target value, and outputting an evaluation of energy efficiency on the basis of the comparison.

In a further advantageous embodiment of the inventive method, the at least one first parameter further characterizes an energy consumption of at least one further apparatus B, and the at least one second parameter further characterizes an operating state of the at least one further apparatus B, and the method furthermore comprises the procedural steps: determining at least one second characteristic value, which characterizes at least the energy efficiency of the at least one further apparatus B on the basis of the first data set and the second data set as a function of the at least one driving state; consolidating the at least one first characteristic value characterizing at least the energy efficiency of the at least one apparatus A and the at least one second characteristic value characterizing at least the energy efficiency of the at least one further apparatus B for the respectively same driving state into one total collective characteristic value characterizing an energy efficiency of the system of the at least two apparatus A and B.

As stated above with regard to the inventive system, the energy efficiency of entire units can in this way be characterized from individual apparatus by means of total characteristic values.

In a further advantageous embodiment, such a total characteristic value can indicate the energy efficiency of a powertrain, a steering system or the entire vehicle.

In a further advantageous embodiment of the inventive method, the first data set further characterizes an energy consumption of at least one further apparatus B and the second data set further characterizes an operating state of the of at least one further apparatus B, wherein the at least one apparatus A supplies energy to at least one apparatus B and the method further comprises the procedural step: adjusting the energy consumption of the at least one apparatus A and the energy consumption of the at least one apparatus B.

Modules and components of a vehicle are usually provided as an aggregate of multiple apparatus, each of which consumes energy and thus has its own energy efficiency. In order to determine the individual energy efficiencies of the various apparatus incorporated into a module or in a component of the vehicle, the respective energy consumption of the individual apparatus must be identified. In the case of apparatus which feed energy between each other, this can ensue by determining the incoming energy E(in) being supplied to an apparatus B, wherein its energy is subtracted from the energy consumption of the providing apparatus A.

In a further advantageous embodiment of the inventive method, the apparatus A is the steering system or one of its components and/or structural elements and a steering system operating state can be at least from the following group of operating states: turning into curves, turning out of curves, constant steering angle, deactivated or activated state of a steering actuator, servo operation, manual operation, or also a combination of at least two of the operating states.

Particularly the energy needed to be applied to the steering system to achieve the respectively required effect can be calculated on the basis of these steering system operating states and the driving state.

In a further advantageous embodiment of the inventive method, the apparatus A is the drive device or one of its components and/or structural elements and a drive device operating state can be at least from the following group of operating states: overrun operation, partial load operation, full-load operation, deactivated, activated, starting operation, no-load operation, or also a combination of at least two of these operating states.

Also in the case of the drive device, the energy which the drive device needs to provide to achieve the driving state can preferably be derived from a combination of the driving state in conjunction with the operating state.

In a further advantageous embodiment of the inventive method, the at least one second parameter is further suitable for characterizing a topography of the vehicle's surroundings.

By determining the topography of the vehicle's surroundings, an operation strategy of the vehicle can be adapted to a change in course on the road which the vehicle is traveling prior to reaching the respective course of the road. Considerable gains in efficiency can be thereby be achieved in terms of the total efficiency of the vehicle.

In a further advantageous embodiment of the inventive method, the at least one apparatus A is an internal combustion engine or a fuel cell system and the first parameter is at least one emission of the internal combustion engine or fuel cell system.

According to this embodiment, the energy consumption of the internal combustion engine or the fuel cell system, which comprises a reformer, can be determined by measuring emission, particularly the $CO_2$ emission. Preferably, the energy supply and energy drain of an energy storage device is also taken into account in the process.

In a further advantageous embodiment of the inventive method, the procedural steps continue until the third data set spans a plurality of different driving states.

In a further advantageous embodiment, the inventive method further comprises the following procedural step: determining the sequence of the driving states, whereby the sequence of driving states is taken into account in the determining of the characteristic value.

In a further advantageous embodiment of the inventive method, the values of the first data set and/or the second data set are integrated over the duration of the respective vehicle operating state, particularly the driving state.

This complex integration and in particular consolidation of the values enables determining a characteristic value over the total duration of a driving state.

In a further advantageous embodiment of the inventive method, the values from a plurality of data sets on various driving states are consolidated in the process of determining the at least one characteristic value.

Doing so thereby enables a statistical evaluation of identical driving states.

In a further advantageous embodiment, the inventive method further comprises the following procedural step: allocating the values of the first data set and the second data set to the at least one predefined driving state in order to take into account a signal propagation delay and/or elapsed time from at least one measuring medium for acquiring the respective data set to a sensor.

In a further advantageous embodiment, the inventive method further comprises the following procedural step: defining an operating mode of the vehicle on which the evaluation additionally depends and which is selected particularly from the following group of operating modes: efficiency-oriented operating mode, mileage-oriented operating mode, comfort-oriented operating mode, consumption-oriented operating mode, reduced-emission operating mode, driveability-oriented operating mode, NVH comfort level-optimized operating mode.

By determining an evaluation in additional dependence on the further boundary conditions and/or criteria, the emission, driveability and/or NVH level can not only be optimized to an absolute maximum for the apparatus A energy efficiency in an optimizing process, but also relative maximum values which comply with the further boundary conditions can be determined for the energy efficiency. Doing so particularly advantageously resolves conflicts of objectives when optimizing a vehicle.

In a further advantageous embodiment of the inventive method, the parameters of the data sets are measured during real-drive operation of the vehicle, wherein it is preferential for the vehicle to travel an actual driving route selected pursuant to stochastic principles, more preferential for a real vehicle to travel an at least partly simulated route selected pursuant to stochastic principles, even further preferential for an at least partly simulated vehicle to travel an at least partly simulated route selected pursuant to stochastic principles, and most preferential for a simulated vehicle to travel a simulated route selected pursuant to stochastic principles.

As defined by the invention, a real-drive operation of a vehicle is vehicle operation from the perspective of an operator's actual everyday driving, for example driving to work, shopping or to a vacation destination.

The method according to the invention enables disassociating test operation from driving cycles, wherein characteristic values are determined as a function of individual driving elements, particularly driving states. On the basis of this information, any driving cycle which represents real-drive operation of a vehicle can be formulated.

The inventive method can be used both to evaluate a real vehicle as well as to evaluate a partly simulated/emulated or fully simulated/emulated vehicle. In the real vehicle case, same is subjected to real operation and the parameters which form the data sets determined by sensor measurements.

In the partly simulated case, a simulation model is created for the entire vehicle with its parameter values for at least one parameter of a data set calculatively determined. The tests are in particular conducted on test beds, whereby parameter values are determined for those parameters or data sets respectively for which measurements are possible, preferably by means of a measurement.

In the case of a fully simulated evaluation, the entire vehicle is simulated and the test operation occurs entirely as a simulation without a test bed, whereby measured parameter values for individual vehicle components or systems can be incorporated into the simulation. When evaluating a real vehicle, the real vehicle can be operated both in traffic and off-road or also on a simulated route and/or simulated terrain on the roller test rig. In accordance with these possibilities of using the inventive system and the inventive method for evaluating a real vehicle based on a full or semi-simulation of the vehicle, the term "acquire" as defined by the invention means importing data sets generated in particular by simulation, indicating an operating state of a power unit of a real or simulated vehicle, and/or conducting measurements on real vehicles or on components or systems of a real vehicle on a test bed.

Figure 2:
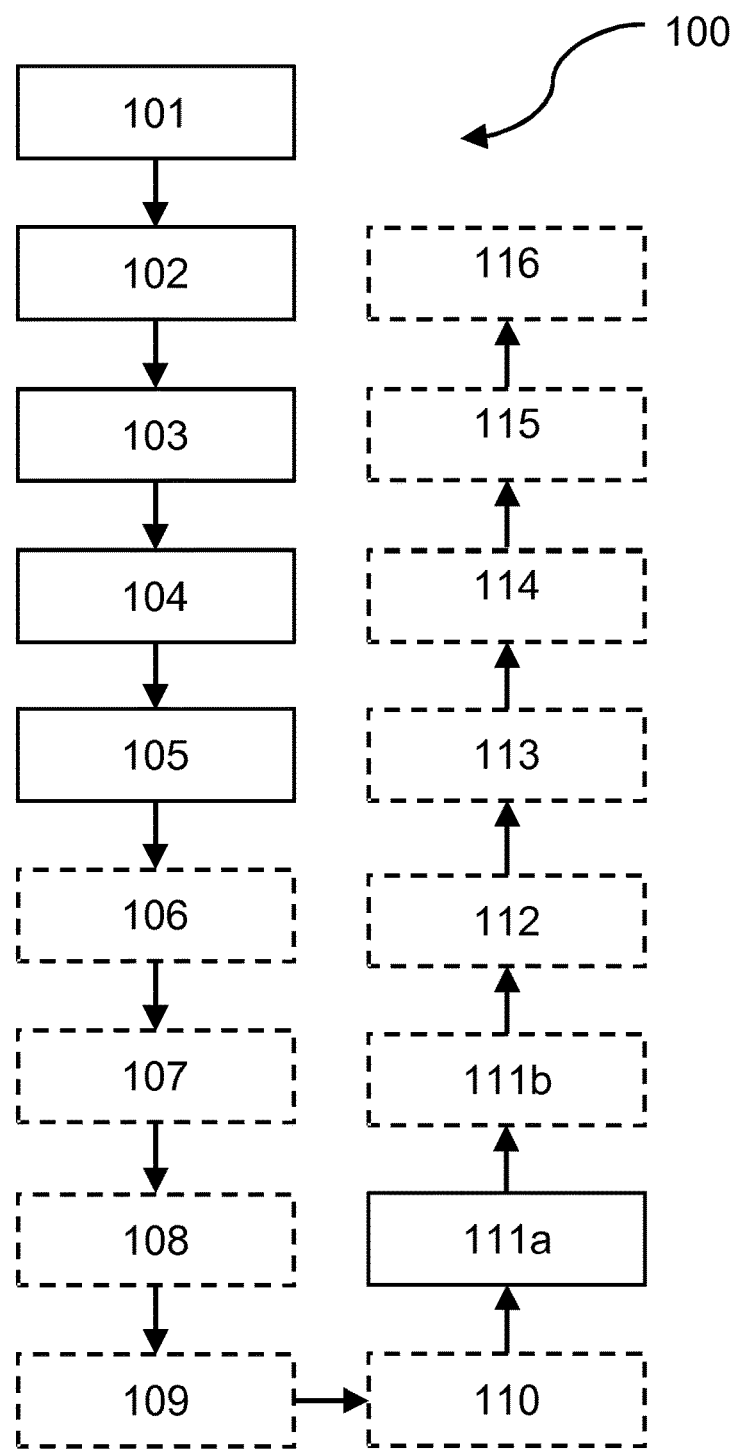
Figure 3:
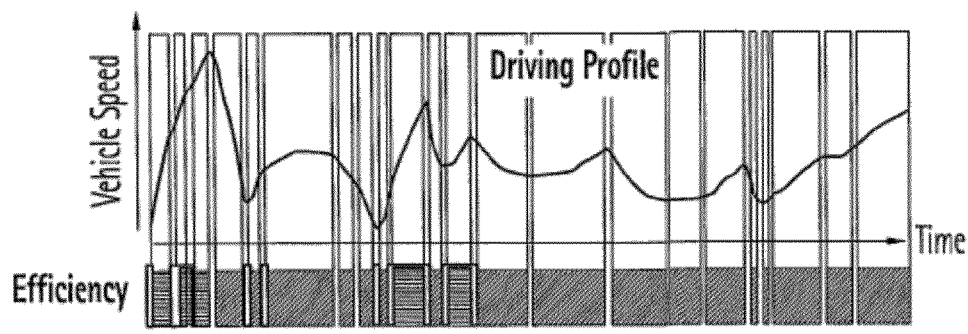
Figure 4:
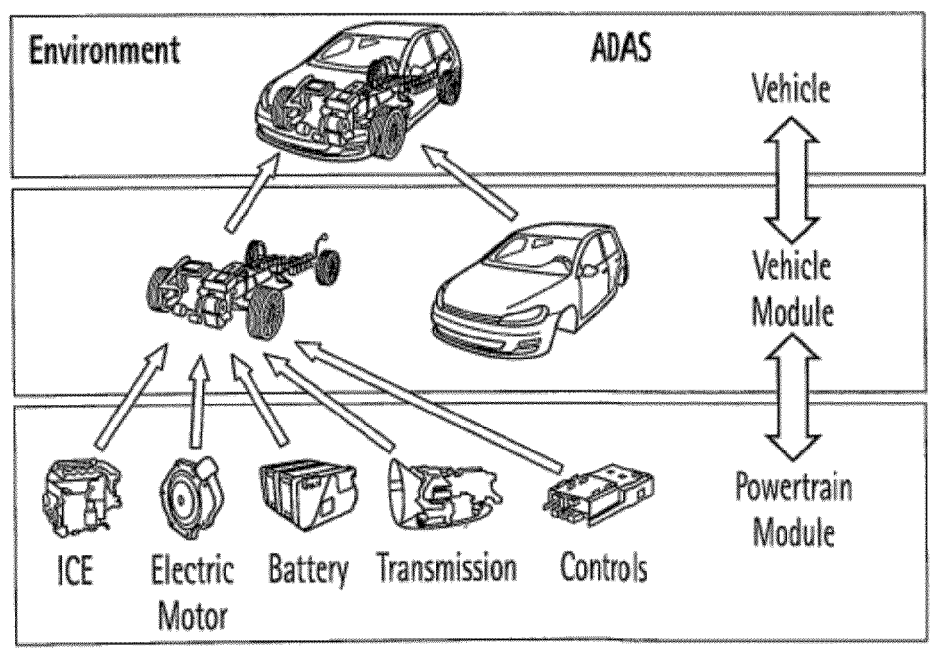
Figure 5:
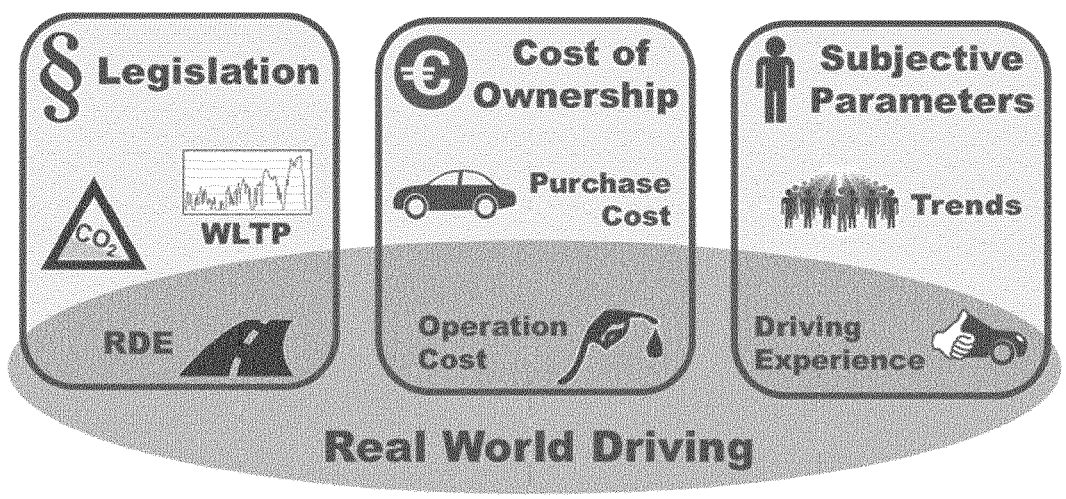
Figure 6:
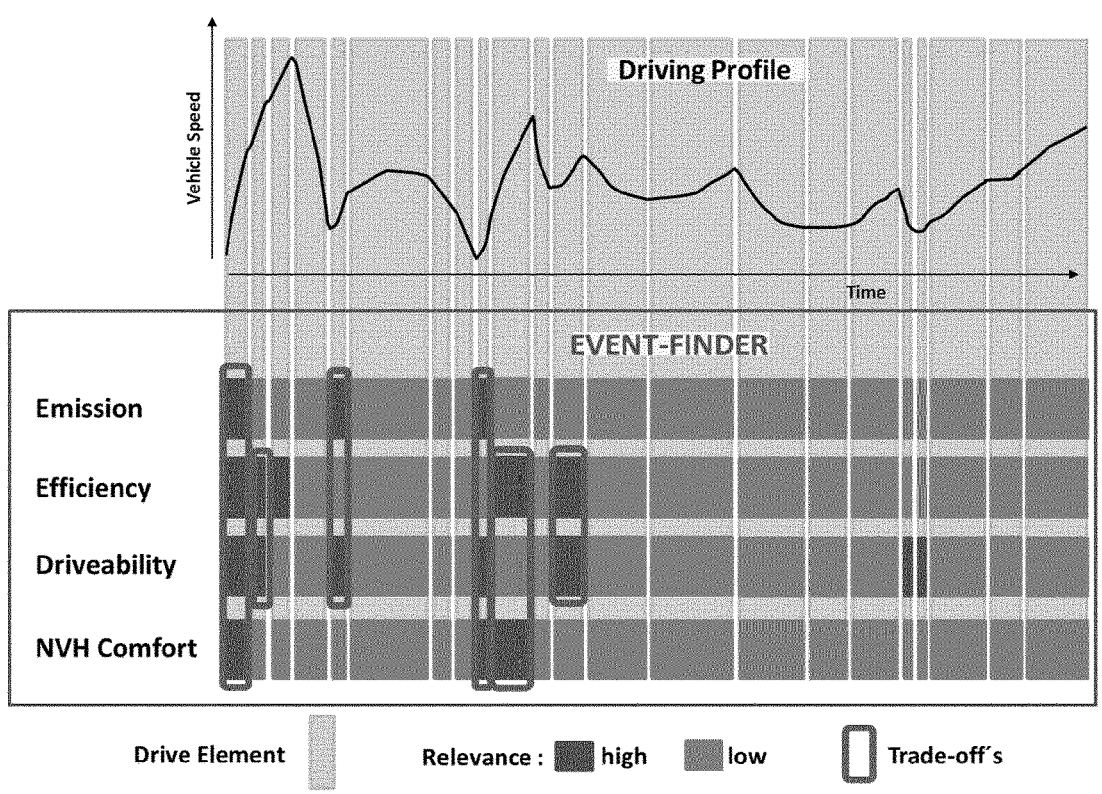
Figure 7:
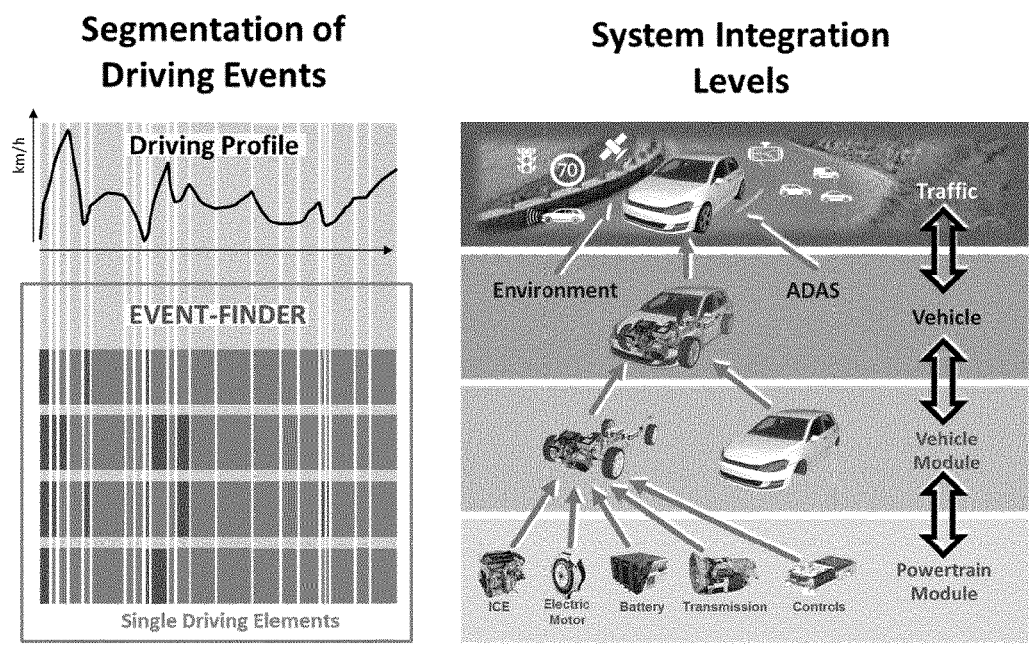
Figure 8:
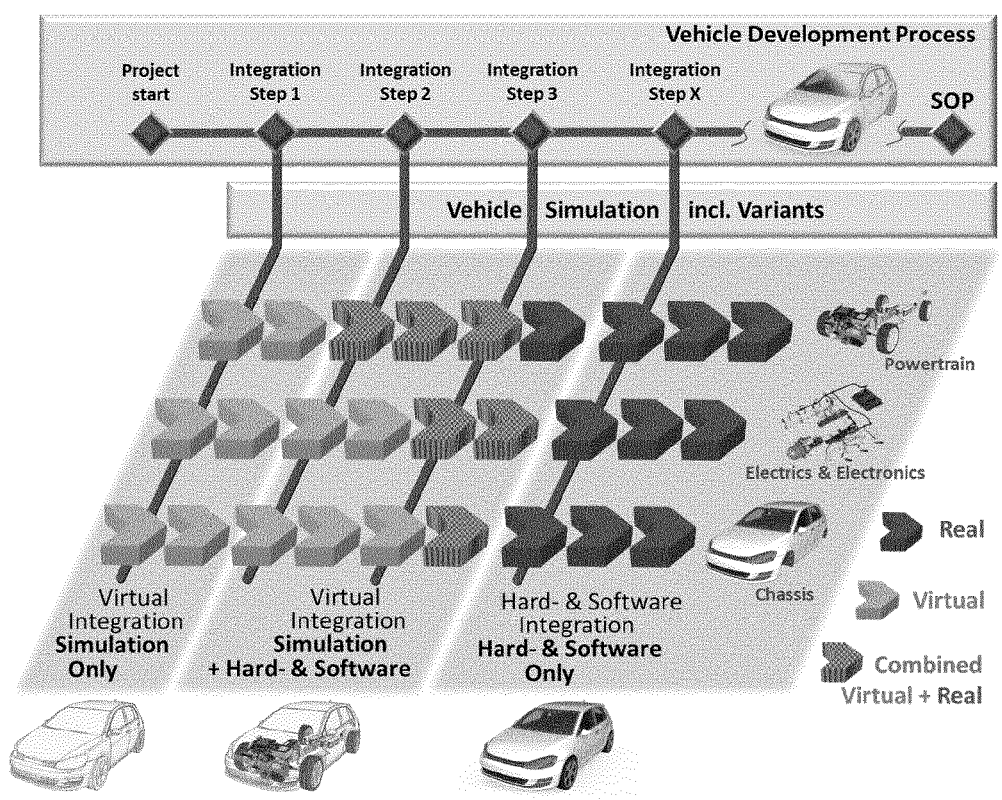
Figure 9:
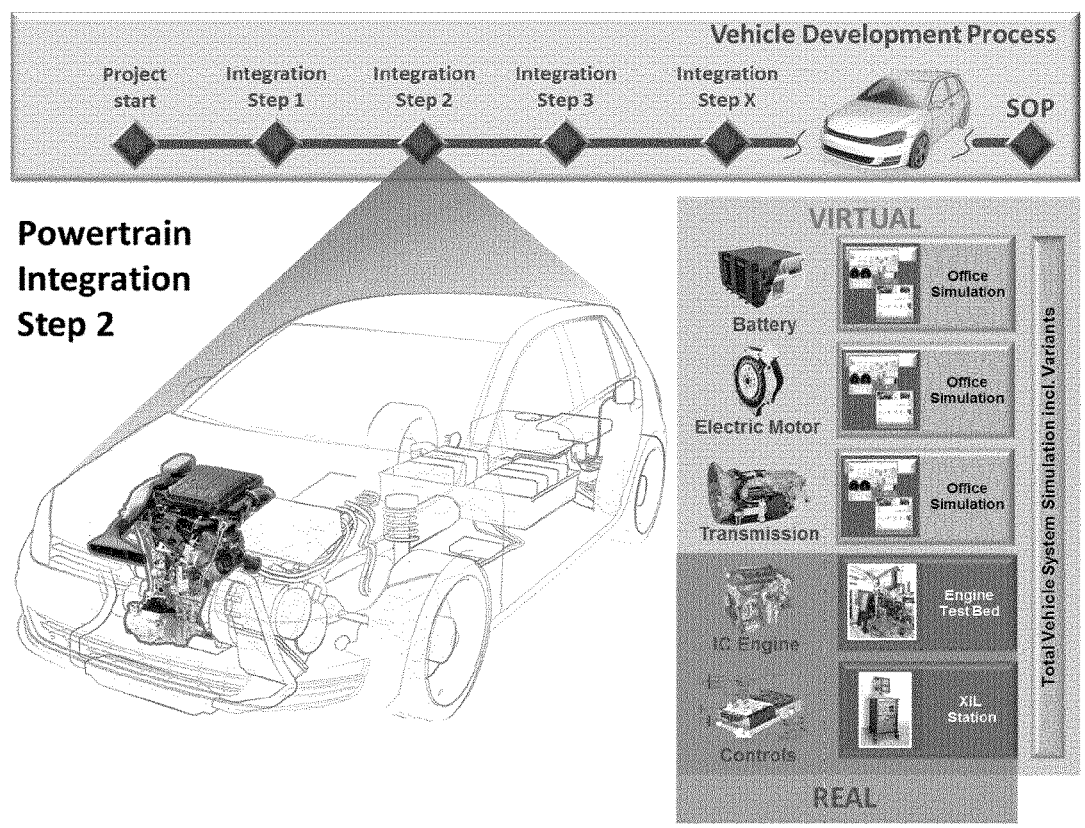
Figure 10:
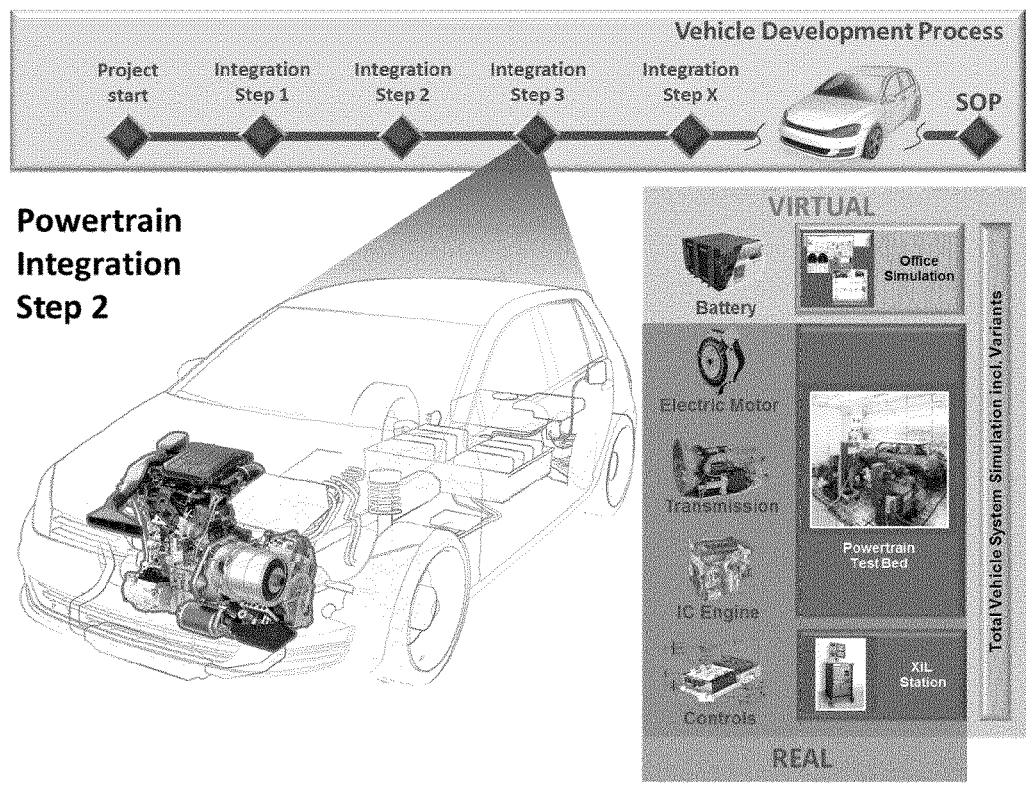
Figure 11:
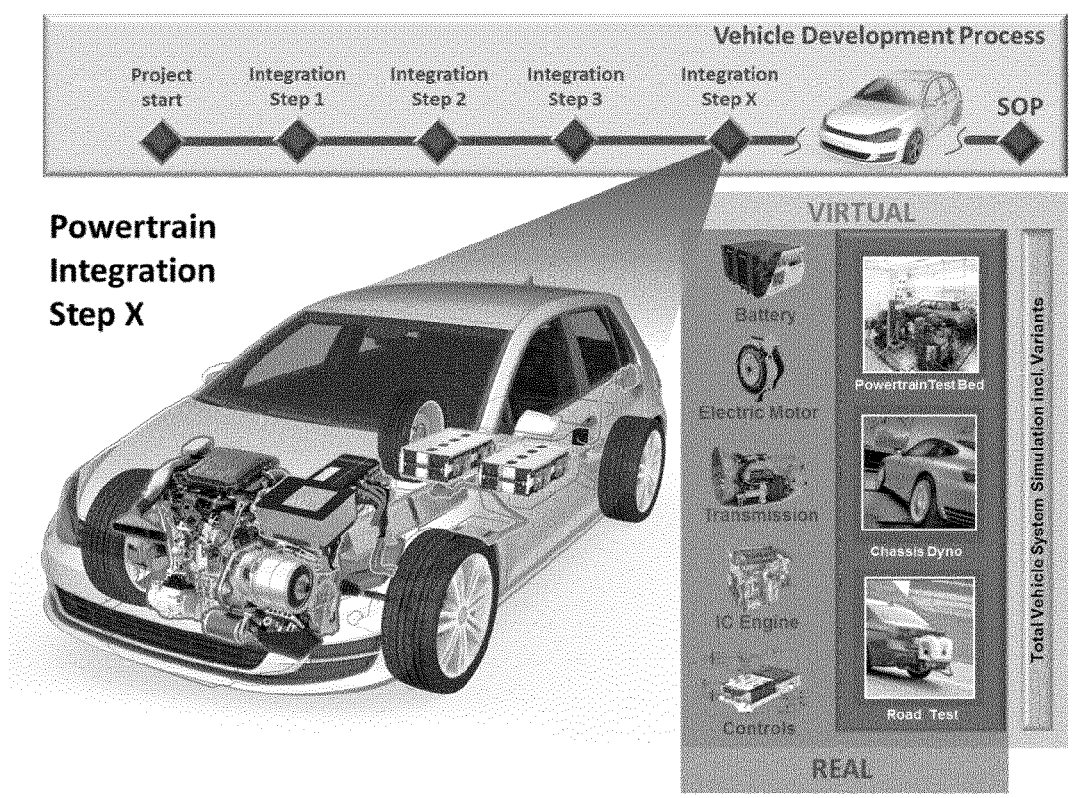
Figure 12:
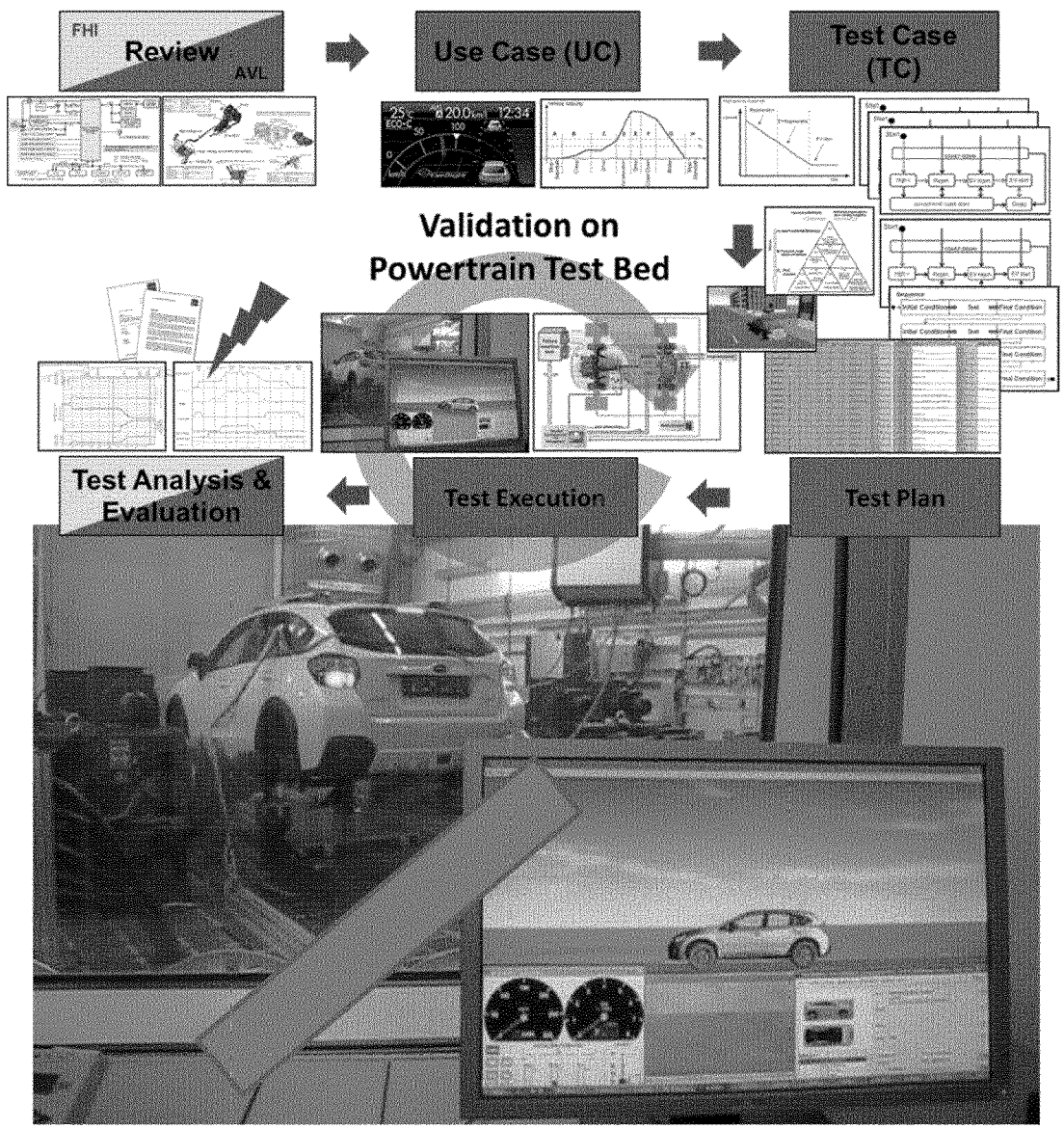
Figure 13:
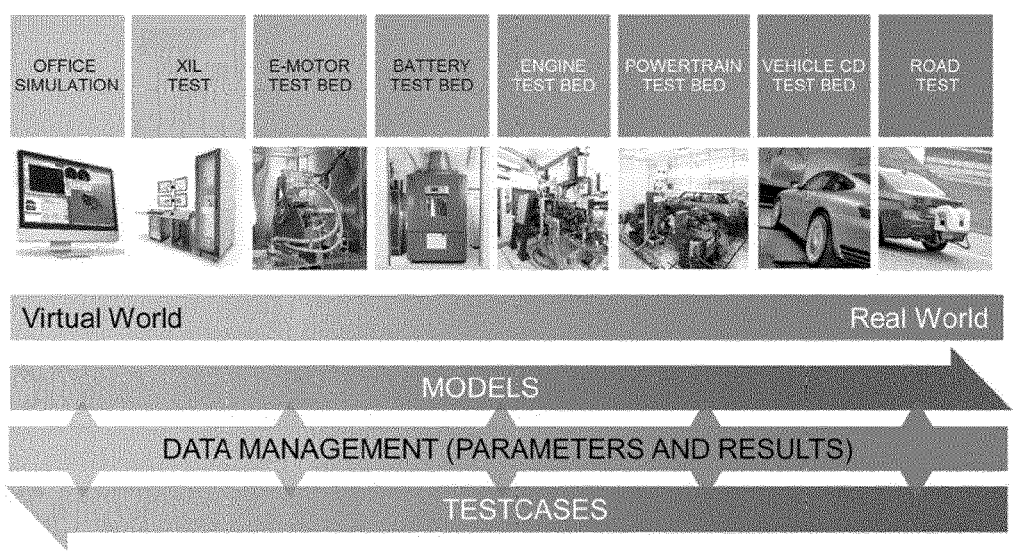
Figure 14:
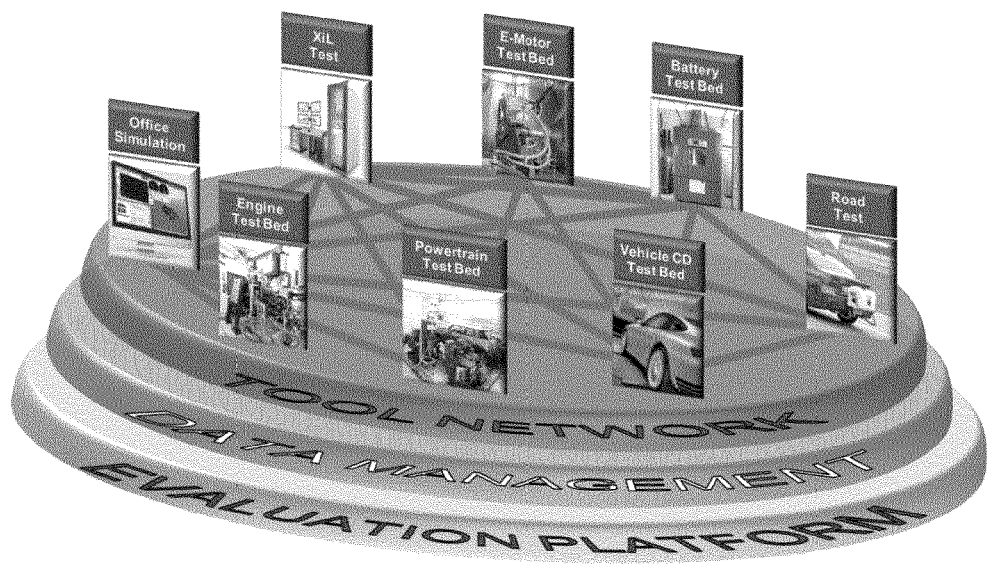
Figure 15:
Figure 16:
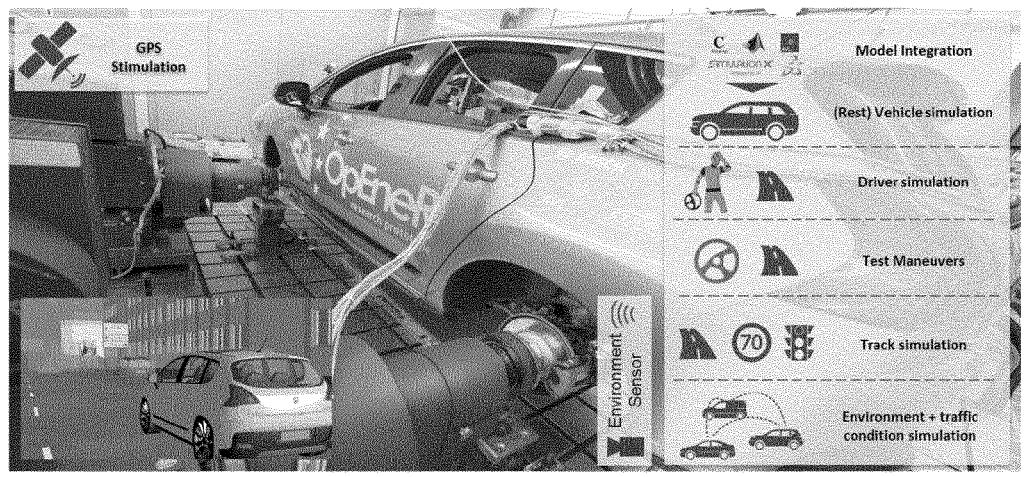

Further advantages, features and possible applications of the present invention will follow from the description below in conjunction with the figures. Shown are:

FIG. 1 a partly schematic depiction of a vehicle comprising an embodiment of the inventive system for evaluating and/or optimizing the energy efficiency of a motor vehicle;

FIG. 2 a partly schematic block diagram of the inventive method for analyzing the energy efficiency of a motor vehicle;

FIG. 3 a partly schematic diagram of a classification of the system integration of an entire vehicle pursuant to one embodiment of the inventive system and inventive method for analyzing the energy efficiency of a motor vehicle; and FIG. 4 a partly schematic diagram of a segmented driving profile of an embodiment of the inventive system and inventive method for analyzing the energy efficiency of a motor vehicle;

FIGS. 5 to 16 relate to further aspects of the invention.

FIG. 1 shows an embodiment of the inventive system in a vehicle 2 having a drive device 3 purely as an example. The drive device 3 is hereby in particular a component of the powertrain extending as applicable from the drive device 3 to the transmission 19 and a differential 21 via a drive shaft and then via axles on to wheels 18b, 18d, and also to further wheels 18a, 18c in a four-wheel drive. The drive device 3 is preferentially an internal combustion engine or an electric motor. The drive device can preferably also comprise a fuel cell system, particularly with a reformer and a fuel cell, or a generator with which energy from a fuel, particularly diesel, can be converted into electrical energy. The drive device 3 draws the energy from an energy storage device 15 which can in particular be configured as a fuel reservoir, or as an electrical energy store, but also as a compressed air reservoir. The drive device 3 converts energy stored in the energy storage device 15 into mechanical propulsion by way of energy conversion. In the case of an internal combustion engine, a transmission 19 and a differential 21 transmit the mechanical energy via drive shafts and the axle to the drive wheels 18*b*, 18*d* of the vehicle 2. A part of the energy stored in the energy storage device 15 is diverted as mechanical energy to auxiliary equipment directly or with a conversion step by the drive device 3. Auxiliary equipment is hereby in particular an air conditioning system or fan but also servomotors, e.g. for the window lifts or an electromechanical or electrohydraulic steering actuator 16 or brake force booster; i.e. any assembly which consumes energy but is not directly involved in generating the drive of the vehicle 1. Exhaust and/or emissions which may ensue from the operation of the drive device 3, for example from the fuel cell system or the internal combustion engine, are discharged to the environment by means of an exhaust gas treatment apparatus 22, e.g. a catalytic converter or a particulate filter, and by the exhaust system 23. Preferably, the vehicle 2 can also have two drive devices 3, in particular an internal combustion engine and an electric motor, whereby in this case, two energy storage devices 15, in particular a fuel reservoir and an electrical energy store, are also provided.

The invention can be used to analyze any other type of vehicle having a multi-dimensional drive system. In particular, the invention can be used with vehicles having parallel hybrid drive, serial hybrid drive or combined hybrid drive.

The objective of the invention is that of determining the total energy consumption of the vehicle, determining the energy required for propulsion and any additional functions, and ascertaining a generally applicable energy efficiency for the vehicle therefrom.

The following will reference FIG. 1 in describing the inventive system 1 provided for the above purpose in a real vehicle, whereby the data sets of the various parameters are preferably determined by measurements. However, in further embodiments, which are not depicted, it can preferably also be provided for parts of the vehicle 2 to be simulated or emulated and only effect some data sets on the basis of measurements of the vehicle's remaining real systems and components or the outputs of the emulators respectively. Further preferably, it can also be provided for the entire vehicle with all its components and systems to be simulated.

A multi-mass oscillator can be used as a simulation model for the vehicle, its parameters adapted to a specific vehicle or group of vehicles.

The system 1 with all its components can be disposed in the vehicle. With tests on a real vehicle 2 and with partly simulated tests, the components of the system 1 which are not needed for the measurement performed on the vehicle or the test object on a test bed can also be located at a different location, for example in a back-end or on a central computer respectively.

The energy efficiency analysis of a vehicle 2 is depicted in the embodiment shown in FIG. 1 with the steering and powertrain systems or, respectively, with the electromechanical or hydromechanic steering actuator 16 and steering control 17, or the drive device 3, energy storage device 15 and transmission 19 components as applicable. It is however evident to one skilled in the art that the methodology of the invention can also be applied to further systems, components and structural elements of the vehicle 2 such as, for example, the braking system and any further drive mechanisms, etc. there might be.

In the embodiment depicted in FIG. 1, the drive device 3 is an internal combustion engine with an exhaust gas treatment 22 and an exhaust system 24. An energy storage device 15 consists of the electrical energy store; i.e. the battery of the vehicle, and the fuel reservoir.

The energy which is drawn from this energy storage device is preferably determined by at least one second apparatus, in particular a sensor 4*a*. Further preferably, at least one emission can be determined by a sensor 4*b* on an exhaust analysis device 23. Particularly advantageously, this is representative of the energy used by the internal combustion engine 3. The exhaust analysis device 23 can hereby be arranged upstream or downstream of the exhaust gas treatment.

The system 1 further preferably comprises a second device which preferably comprises sensors 5*a*, 5*b*, 5*c*, 5*d* able to acquire an operating state of an apparatus A. In the case in which the apparatus A is the internal combustion engine 3 of the vehicle 2, such operating states can be overrun operation, partial load operation, full-load operation, internal combustion engine deactivation, internal combustion engine activation, starting operation, no-load operation, or also a combination of at least two such operating states. The sensors 5*a*, 5*b*, 5*c* and 5*d* can for example draw on the torque, the rotational speed, the throttle valve position, the gas pedal position, the negative intake manifold pressure, the coolant temperature, the ignition timing, the injected fuel quantity, the $\Delta$ value, the exhaust gas recirculation rate and/or the exhaust temperature as parameters for characterizing the operating state.

If the apparatus A to be analyzed is for example the steering system of the vehicle 2, operating states can then for example be a turning into a curve, a turning out of a curve; i.e. a change of the steering angle and/or the speed of change, a constant steering angle, a deactivated electromechanical or hydromechanical drive, a servo operation, a manual operation, or also a combination of at least two of these operating states. Second parameters, which can be used to acquire such an operating state, are in particular the steering angle $\alpha$, a force or a signal transmitted between a steering control 17 and a steering actuator, the determining of a steering wheel 20 control and/or an energy consumption of the steering actuator 16.

As will be described with respect to the inventive method, the energy an apparatus A needs to apply to fulfill its intended function can be dictated by the operating state, which is determined by at least one sensor 5*a*, 5*b*, 5*c* and 5*d* of apparatus A and the driving state of the vehicle 2. In the case of the drive device 3, or an internal combustion engine respectively, this intended function is the generating of mechanical energy so as to achieve propulsion of the vehicle 2; i.e. so as to overcome the driving resistance as well as powertrain resistances.

In the case of the steering system, such an intended function is translating driver input as regards the direction of travel of the vehicle 2. As the processing device 9 associates the energy to fulfill the intended function of apparatus A with the actual energy consumption of apparatus A, a characteristic value can be determined which indicates the individual energy efficiency of apparatus A, particularly as a function of the respective driving state.

The system 1 further comprises a third device, or at least one sensor 6 respectively, which enables determining at least one parameter which is representative of the driving state of the vehicle 2. At least one parameter from the following group of parameters is hereby applicable as the parameter: engine speed, throttle valve position or gas pedal position, vehicle speed, vehicle longitudinal acceleration, negative intake manifold pressure, coolant temperature, ignition timing, injected fuel quantity, λ value, exhaust gas recirculation rate, exhaust temperature, engaged gear and gearshift change. For example, in FIG. 1, the drive wheel 18d rotational speed is determined by means of an incremental encoder 6, whereby the vehicle speed is able to be concluded at which for example the rolling at constant speed driving state and differing acceleration states can be determined. The system 1 furthermore comprises an allocation device 8, which is in particular part of a data processing device and which can allocate the determined energy consumption of the vehicle and the driving resistance of the vehicle to the respective driving state present at the time of measuring the respective parameter values. The energy the vehicle 2 needs to provide in order to produce a specific performance dictated by the driver can preferably be concluded from the driving resistance which the vehicle 2 needs to overcome. By comparing this energy to be provided by the vehicle 2 to the energy consumption of the vehicle 2, which is preferably determined by the sensors 4a, 4b, a characteristic value for the vehicle's energy efficiency can be specified. This is preferably calculated by a processing device 9, which likewise is in particular part of a data processing device.

Preferably, the inventive system 1 comprises a further fourth device 10 which can acquire a target value for the at least one characteristic value. Preferably, this fourth device 10 is an interface with which corresponding target values can be imported, further preferably this fourth device 10 is a simulation device for a vehicle model which generates a target value for the at least one characteristic value. By means of a second comparison device 11, the system can preferably compare the target value to the characteristic value and then output to a display 12.

A vehicle model as per the invention is a mathematical model of a vehicle. It preferably comprises both the hardware configuration and the corresponding operating strategies for the vehicle as well as its systems and components.

The system 1 preferably further comprises a fifth device 14 which is designed to depict the driving resistance of the vehicle 2 at the current moment. Such a fifth device 14 is preferably suited to determining all driving resistance components having an impact on the vehicle 2; i.e. the aerodynamic drag, the rolling resistance, the climbing resistance and/or the acceleration resistance. Preferably, the process draws on vehicle specifications such as the vehicle weight and the Cw value, which are available e.g. from the manufacturer. Other parameters which change with the temperature or the navigable condition can be determined by sensors. Aerodynamic drag thereby in particular addresses the Cw value, the frontal area of the vehicle and the speed, the rolling resistance addresses the resilience of the wheel, the tire pressure and wheel geometry, the road surface properties which can be ascertained e.g. from a database, as well as the condition of the road. Climbing resistance addresses in particular the vehicle weight and the slope, whereby a barometric or GPS altimeter can determine the slope for a Δ distance traveled. The acceleration resistance depends in particular on the mass and the acceleration of the vehicle 2.

All the sensors 4a, 4b, 5a, 5b, 5c, 5d, 6 of system 1 are preferably connected to a data processing device which in particular comprises a first comparison device 7, an allocation device 8, a processing device 9, a data interface 10, a second comparison device 11 and an output device 12, by means of a data connection, particularly through the data interface 10. The data connections are depicted schematically in FIG. 1 by dotted lines.

Moreover, the system 1 preferably comprises a data storage unit 25 in which a succession of driving states and the associated further data can be stored.

Further preferably, the processing device 9, which particularly comprises a microprocessor having a working memory and further is in particular a computer, can factor in the succession of driving states when determining the characteristic value and when allocating the respective data set to the driving state and can adjust the allocation for a signal propagation delay or an elapsed time between a measuring medium and a sensor.

The following will reference FIGS. 2, 3 and 4 in illustrating one embodiment of the method 100 according to the invention.

The inventive method serves in the analyzing of the energy efficiency of an apparatus A, or a vehicle 2 respectively, and particularly in the determining of a characteristic value and an evaluation which is generally valid and not based on one specific driving cycle. The indication of an energy efficiency and the evaluation of the energy efficiency of individual apparatus A of the vehicle 2 allows the vehicle 2 to be subdivided into individual vehicle elements pursuant to a finite element method. Particularly when modeling the overall system of the vehicle 2, such a division of the vehicle 2 into vehicle elements enables a substantially more precise result to be achieved.

The approach on which the invention is based is thereby on the one hand a segmenting of complex driving profiles into assessable driving elements which in particular correspond to driving states and, on the other, a categorizing of the system integration of the entire vehicle 2 into individual vehicle elements such as, for example, systems, components or also structural elements of the vehicle, e.g. the drive device or the steering system.

In a first procedural step 101, parameters indicating the energy consumed by an apparatus A are determined 101. In the case of a steering system, which in particular consists of the steering actuator 16, steering control 17 and steering wheel input/steering wheel 20 components as well as further mechanical components such as the steering linkage, such an energy consumption is in particular characterized by the provision of the power needed to drive the wheels 18c steering the vehicle 2 and to keep the wheels 18a, 18c in their position. If the vehicle 2 does not have any driver assistance system, this energy has to be supplied by the driver via the steering wheel 20. Normal vehicles 2 known at the time of application have at least one steering actuator 16 which converts the steering commands of a driver input via the steering wheel 20 into a change of steering angle α. The steering angle α is thereby in particular the angle between the vehicle center axis and the rolling direction of a wheel 18a, 18c, as depicted in FIG. 1. The steering actuator 16 is usually an electromechanical or hydromechanical device which converts electrical energy or hydraulic energy into mechanical energy to move the wheels 18a, 18c. This energy is either supplied directly from the drive device 3 by way of a hydraulic fluid or is provided through an electric line from an electrical energy storage device 15. Additional energy consumed by the steering system is for example the electronics of a steering control 17 or also power electronics for controlling the steering actuator 16. In this example, a first parameter, which can be determined by a sensor 4a, is the electrical energy provided to the steering system. A further parameter, which in the case of a hydromechanical steering actuator 16 needs to be factored in, is the energy which the steering actuator 16 diverts from the hydromechanical supply; i.e. the energy supplied in this case from the drive device 3.

In the case of analyzing an apparatus A being a drive device 3, particularly an internal combustion engine, the energy consumption is firstly defined by the fuel supplied. Further to be considered is that energy may be fed as applicable to the internal combustion engine 3 via auxiliary equipment, particularly electrical auxiliary equipment, for example by an electrically powered compressor or also various pumps. These energy inputs from auxiliary equipment of course only need to be factored into an energy balance for the internal combustion engine when the internal combustion engine does not directly operate the auxiliary equipment. For an approximate energy balance for the internal combustion engine 3, it can also be provided to disregard the energy balance of the auxiliary equipment since in the overall system of the vehicle 2, the energy to operate the auxiliary equipment in continuous operation is also exclusively provided by the internal combustion engine 3. The energy, which is supplied to the internal combustion engine chemically by means of the fuel, can be determined by a sensor 4a which records the consumption history of the internal combustion engine 3. Another possibility is measuring emissions with a gas sensor 4b of an exhaust analysis device 23, with which the energy consumption of the internal combustion engine can likewise be deduced. Approximate auxiliary equipment energy flows can be incorporated into the energy consumption of the internal combustion engine 3 determined from the energy consumption of the auxiliary equipment or by sensors which determine the mechanical energy the auxiliary equipment provides.

The inventive method further determines the operating state of the apparatus A to be analyzed. In the case of the steering system, such an operating state is for example a turning into curves, a turning out of curves, a constant steering angle, a deactivation or activation of a steering actuator 16, a servo operation, a manual operation or also a combination of at least two of these operating states. Two of the parameters by means of which these operating states can be determined are preferably the steering angle $\alpha$ as well as its change, the energy consumption of components of the steering system, e.g. the steering actuator 16, and a rotational angle of the steering wheel 20 or its change. If the apparatus A to be analyzed is an internal combustion engine 3, possible operating states are overrun operation, partial load operation, full-load operation, deactivated, activated, starting operation, no-load operation, or also a combination of at least two of these operating states. Two of the parameters which can be used to determine these operating states are the engine speed, a throttle valve position or gas pedal position respectively, a vehicle speed, a negative intake manifold pressure, a coolant temperature, an ignition timing, an injected fuel quantity, a $\lambda$ value, an exhaust gas recirculation rate and/or an exhaust temperature.

In further procedural steps, the driving state of the vehicle is determined 103, 104, 105 on the basis of parameter ranges predefined for one or more driving states, whereby a third parameter suitable for characterizing 103 a driving state is determined/measured and this parameter is compared 104 to reference parameter ranges for vehicle states, wherein the respectively measured parameter values can be allocated 105 a driving state therefrom. Possible driving states are hereby for example rolling at constant speed, acceleration, cornering, parking, straight-line driving, idling (coasting), tip-in, let-off, constant speed, shifting, overrun, standstill, ascending, descending or also a combination of at least two of these driving states. The driving states can be determined by means of the third parameters, for example the speed, which can be determined via a sensor 6, particularly an incremental encoder. Further third parameters include the state of the clutch (opened, closed), detecting an engaged gear or a change of gear, the position of the gas pedal, the topography of the surroundings, etc.

Applicable to both the determining of an operating state of apparatus A or B as well as the determining of a driving state is that the respective state can be refined in any manner so that parameters up to each individual combination of parameter values of the at least one second or at least one third parameter can in each case be associated with an operating state or a driving state.

The energy which the respective apparatus A needs to perform its intended function can be defined from the determined driving state in conjunction with the determined operating state of apparatus A.

In the case of analyzing the steering system, a differentiation basically needs to be made between operating states with actuated steering system and operating states during a steering system rest phase in the process of determining the energy to be supplied. When the steering system is actuated, force needs to be provided to overcome internal resistances in the steering system and, depending on whether the vehicle is standing still or in motion, to overcome static friction forces between the tires and the road and the moment of inertia of wheels 18a, 18c. These influencing factors can be determined by measurements and from the manufacturer's data as well as some simple assumptions. In the case of a constant steering angle $\alpha$ ($\alpha \neq =$) and a moving vehicle 2, although no force needs to be supplied to steer the steering wheel or to overcome resistances in the steering system respectively, return torque must be exerted by the wheels due to the weight force of the vehicle and geometry of the steering system in curves. The energy needed to overcome this return torque can be derived from the steering angle $\alpha$, the weight as well as the speed of the vehicle, and further assumptions as applicable.

In the case of an internal combustion engine 3 being the apparatus A to be analyzed, the energy to be provided is that energy which overcomes the driving resistance as well as further resistances there may be in the powertrain such as, for example, frictions. The driving resistance can be determined from various environmental and topographic information as well as measurements. Vehicle-internal resistances can be determined for example with the sensors 5a, 5c, 5d and 6 in the powertrain, as depicted in FIG. 1. A further energy to be supplied can be provided for charging the vehicle battery or also a larger electrical energy store such as the accumulators of a hybrid vehicle depending on the respective operation strategy of the vehicle 2.

All the driving resistance components which impact the vehicle 2; i.e. the aerodynamic drag, rolling resistance, climbing resistance and/or the acceleration resistance, can in particular be determined from the driving state of the vehicle 2 and the operating state of the apparatus A. Preferably, vehicle specifications such as the vehicle weight and the Cw value, which are available e.g. from the manufacturer, are thereby referenced. Other parameters which change with the temperature or the driving state can be determined by sensors and are provided as second or third parameters. Aerodynamic drag thereby in particular addresses the Cw value, the frontal area of the vehicle and the speed, the rolling resistance addresses the resilience of the wheel, the tire pressure and wheel geometry, the road surface properties which can be ascertained e.g. from a database, as well as the condition of the road. Climbing resistance addresses in particular the vehicle weight and the slope, whereby a barometric or GPS altimeter can determine the slope for a Δ distance traveled. The acceleration resistance depends in particular on the mass and the acceleration of the vehicle.

From the energy consumption of the apparatus A, or the steering system or internal combustion engine 3 respectively, and the applicable energy of each in fulfilling their respective function, a characteristic value characterizing the energy efficiency of the at least one apparatus A can be determined 111a. In the simplest case, this is the relationship of energy to be applied and energy provided.

Furthermore, additional apparatus B can preferably also be analyzed, for which the inventive method preferably comprises a procedural step of determining at least one second characteristic value 111b characterizing at least one energy efficiency of a further apparatus B, likewise on the basis of first, second and third parameters. The two characteristic values for the energy efficiency of apparatus A and for the energy efficiency of apparatus B can further be consolidated, preferably into one total value. By indicating a target value, e.g. based on calculations, particularly vehicle simulations, or based on reference vehicles, target values or target functions can preferably be indicated 113, against which the determined characteristic value can be compared in order to determine 114 an evaluation. Preferably, an operating mode of the vehicle is hereby specified, 115, on which an evaluation additionally depends. Example applicable operating modes here include an efficiency-oriented operating mode, a mileage-oriented operating mode, a comfort-oriented operating mode, a consumption-oriented operating mode, a reduced-emission operating mode, a driveability-oriented operating mode and an NVH-optimized operating mode. Not only the absolute optimum energy efficiency of an apparatus A can thereby be determined but also the relative optimum subject to further boundary conditions. For a collective evaluation of multiple apparatus, e.g. an apparatus A and an apparatus B, one respective characteristic value each, a first characteristic value and a second characteristic value, can be determined and preferably evaluated for the energy efficiency of the respective apparatus alternatively to determining a total characteristic value, whereby the individual evaluations can be consolidated later on into a total evaluation for the system. Total characteristic values and/or overall evaluations can thereby in particular be indicated for vehicle 2 systems consisting of multiple components or structural elements such as the powertrain, the steering or even for the entire vehicle as a whole.

By means of the invention, complex random driving profiles can be subdivided into small evaluable and reproducible single elements, both driving elements and vehicle elements, whereby the single elements of the most relevance to an overall result or a total characteristic value respectively can be identified. In a further step, an optimization of all the relevant criteria with respect to the single element factoring in the relevant functional dependences between the criteria can be optimized. The magnitude of a driving element is preferably specified such that, on the one hand, a reliable, reproducible evaluation can be made and, on the other, the characteristics of a finite element are provided so that any given complex driving states can again be reproducibly formulated from the single driving elements.

The driving elements can in particular be evaluated by clustering, meaning arranging into predefined driving state categories, as well as by determining the frequency of occurrence of the driving elements.

The method 100 can be used in online operation with immediate display of the characteristic value. This is for example advantageous if the system 1 is fully installed in the vehicle 2 or a test driver wishes to call up information on the vehicle's energy efficiency or performance during a test drive. The method 100 can however also be used in offline operation for analyzing values recorded during a test drive. Furthermore, the method 100 can permanently run in owners' vehicles and transmit data periodically or in real-time to a back-end and/or central computer for anonymous evaluation. The correlation between a characteristic value and a target value or target value function respectively is preferably portrayed in a mathematical function so that appropriate parameter input into the function will return the evaluation of the energy efficiency as the result of a calculation.

A simple function for calculating a characteristic value KW can be portrayed as follows, whereby the value of the $c_i$ factors are subject to the respectively determined driving state:

$$KW = c_2 \cdot \text{parameter}_1 + c_2 \cdot \text{parameter}_2$$

Calculating an evaluation can accordingly follow, whereby the $c_i$ factors in this case furthermore depend on a corresponding target value function serving as an evaluation reference.

Both the generally applicable characteristic value as well as the generally applicable evaluation of the efficiency of the vehicle 2 are suitable variables for replacing the consumption standards determined on the basis of fixed driving cycles like the NEDC (New European Driving Cycle) or WLTP (Worldwide Harmonized Light Vehicles Test Procedures) as used to date.

Preferably, the characteristic value or the evaluation can also incorporate the environmental topography of the vehicle 2. Whether or not the operation strategy of a vehicle 2 takes accounts of the terrain, e.g. the route ahead of the vehicle, can hereby be factored in so as to achieve the most favorable energy efficiency possible. The operation strategy of a vehicle 2 or an apparatus A of the vehicle 2 could thus for example provide for an electrical energy storage device 15 or a compressed air energy storage device 15 being fully charged over a steep descent so that the respective energy storage device 15 can release this energy again on a subsequent ascent. A laser or lidar system on the vehicle can be used to determine the topography, although the topography can also be determined by means of a GPS system and cartographical material available to the vehicle driver and/or the vehicle 2.

FIG. 3 shows a partially schematic diagram of the result of an inventive segmenting of real-drive measurements with which an analysis was made of the energy efficiency criterion based on the driving elements, in particular driving states, as driven.

The third parameter for the determining of the vehicle state is depicted in the upper part of the diagram and is the vehicle speed over the time, which represents the driving profile of the vehicle 2. Identified driving elements are depicted in the lower part of the diagram to which characteristic values with respect to the energy efficiency of the vehicle 2 are discretely applied or for which an evaluation is made individually.

The efficiency of the vehicle is hereby not averaged over the entire driving profile from the beginning as is common in prior art methods. In the invention, individual driving states are identified and these driving states are associated with the respective driving resistance of the vehicle and the energy consumed in the driving state. A characteristic value expressing the energy efficiency of the vehicle in the tested driving state is calculated on the basis of this allocation.

A categorization according to the invention is exemplarily depicted in FIG. 4. The vehicle 2 can hereby be subdivided into modules such as e.g. powertrain and body. The individual modules can in turn be subdivided into components and structural elements. Components of the powertrain are hereby in particular, as depicted, an internal combustion engine (ICE), an electric motor, a transmission and their electrical controls. An apparatus A can be formed by a module, a component or also by a structural element.

When the system 1 or a user specifies which apparatus A is to be analyzed in the determining of the at least one characteristic value or the evaluation, its energy consumption can then be determined.

In order to determine the energy consumption of an apparatus A which partially consumes energy and partially releases the energy such as, for example, an internal combustion engine or also an electric motor or the transmission, it may be necessary in the determining of the energy consumption to determine both that energy provided to the respective apparatus A as well as that energy which the apparatus A releases again; i.e. an energy balance must be established with respect to apparatus A. As regards a drive device 3 of the vehicle 2, such supplied energy E(in) is defined by the supplied amount of fuel or also the carbon emission of the internal combustion engine; in the case of an electric motor, by the consumption of electrical energy. With respect to internal combustion engines, the supplied energy E(in) may possibly also include energy supplied with regard to additional electric motors, so-called auxiliary equipment.

The output energy E(out) of the drive device, which is supplied for propulsion and for further auxiliary equipment in the vehicle, can be measured on the shaft by way of rotational speed and torque. If only the efficiency of the combustion process by itself is to be determined, it also needs to be considered that the energy supplied to the internal combustion engine from electric motors via auxiliary equipment be offset again at the end from the energy obtained from the combustion by the bypassing of the energy storage device 15 as applicable.

When evaluating a vehicle's development status, however, preferably of interest is not only comparison to the ideal characteristic values and processes normally generated in the concept phase of overall development but rather also the positioning within a specific benchmark distribution range. This is particularly of significance for vehicle analyses in which the basic data necessary for target value calculation is not complete. To produce such a database, tests can be run on the respectively most current vehicles.

The actual optimization results from incorporating the single result-relevant events into the respectively best-suited development environment. For single events primarily relating to only one evaluation variable, the optimization takes place in many cases directly in the vehicle in direct interaction with an automated online evaluation (e.g. compensating specific driveability failings). For those single events in which there are pronounced conflicting objective relationships between the different evaluation variables (e.g. efficiency, emissions, driveability, NVH level, etc.), it is expedient to preferably reproduce the relevant single events on the XiL (software/hardware-in-the-loop), motor and/or powertrain test bed. The reproducible operation as per the teaching of the invention allows efficient single driving element development, whereby there is not only an isolated optimization of a single variable but rather an optimizing of the conflicting objectives of the individual criteria. In addition, given a concurrently running complete vehicle model, the effects on the entire "vehicle" system can also be directly assessed.

A comparison to a real-drive driving element library (benchmark data) preferably enables detailed classification in the competitive environment. This preferably direct assessability enables a fast and accurate response and thus a greater degree of process flexibility.

The driving element consideration based on the events allows both efficient calibration capability as well as also an accurate virtual identification of optimally adapted drive architectures. This also enables the generating of a refined developmental topography map in which the relevant developmental tasks (both technical as well as subjective variables) are marked.

Preferably, a comprehensive real-drive driving element database having corresponding statistics on result-relevant single events as well as a segmented consideration of relevant driving profiles is provided, by means of which important result-relevant task definitions can be accurately addressed not only in the calibration process but also in the early conceptual phase of a powertrain or of vehicle development respectively.

Driving states which are critical to the energy efficiency or for further criteria are preferably indicated on the basis of the physical parameters for the driving state. Based on this representation, driving states which were for example determined during real-world driving with a real vehicle can be reconstructed on the vehicle roller rig, on the powertrain test bed, on the dynamic dynamometer or in an XiL-simulated environment. This enables critical driving states to be tested on the test bed, for example for the purpose of solving conflicting objectives between different criteria.

Further aspects of the invention are described in the following example embodiments which in particular reference FIGS. 5 to 16.

Tightened legal requirements (e.g. $CO_2$, WLTP, RDE) and increased customer requirements ("positive driving experience") as well as the inclusion of all the relevant environmental information ("connected powertrain") result in drastically increased complexity and increasing variation diversity for future drive systems. The development challenges are thereby even further intensified by shortened model life cycles and the additional increased inclusion of actual customer driving ("real-world driving").

Efficient development under expanded "real world" boundary conditions such as for example the expanding of the previous synthesized test cycles to real operation with random driving cycles firstly requires objectifying subjective variables (e.g. driving experience) but also reproducibly determining complex, stochastically influenced characteristic values (e.g. real-drive emissions). To this end, random driving profiles are divided into small, reproducible and assessable driving elements and the relevant trade-off relationships (e.g. driveability, noise perception, efficiency, emission) optimized in the single element. An intelligent "event finder" thereby allows selectively concentrating on those driving elements which have substantial influence on the total result. Additionally, a "real-drive maneuver library" generated therefrom coupled with a comprehensive complete vehicle model forms an essential foundation for positioning individual development tasks in the respectively best-suited developmental environments and thus increasingly in the virtual world.

However, a shortening of the overall total vehicle development process requires not only intensified front-loading during the development of the individual subsystems but also heightened all-encompassing activity in mixed virtual/real developmental environments. The step from digital mockup (DMU) to functional mockup (FMU) and consistent evaluation from the entire vehicle perspective contribute substantially to even being able to control the complexity of future drives within short development times in the first place. With the integrated open development platform IOPD and the expanded evaluation platform AVL-DRIVE V4.0, AVL has hereby created substantial tool and methodology modules.

1. Challenges in Drive Development

The greatest stimuli for advancing passenger car drive systems over the medium and long term will come both from legislation as well as from the end customer.

The significant reduction of CO2 fleet emissions under the threat of penalty fines, stricter test procedures (WLTP) and the additional limiting of harmful emissions in real customer vehicle operation (real driving emission) represent significant tightening of the legal statutory constraints and create substantial additional expenditures for the vehicle development process. On the customer's side, the matter of "Total Cost of Ownership" on the one hand is taking on importance while on the other hand, purely subjective criteria like social trends and social acceptance, etc., but also particularly a "positive driving experience" are having increasing influence on the most critical of purchase factors. Thus, the focus of the representation is expanded from purely technical objective values such as performance and fuel consumption to the satisfying of a positive subjective customer experience—the "experience car" thereby goes far beyond the powertrain performance. The consumers thereby perceive the properties and value of the vehicle such as its styling, ergonomics, operability, infotainment and assistance systems, sense of safety, driving comfort, agility and driveability in a holistic context as the overall vehicle performance.

Thus, actual real-world driving has become particularly important in the development of new vehicle systems: not only real-world emissions and consumption but also the positive driving experience of the customer is a crucial objective criterion. Subjective valuation criteria are, however, subject to more than just rapid changes. New trends, individual requirements and new technologies yield significant unpredictability in a highly dynamic market [1]. The response to this situation can only be extremely rapid reactivity in product configuration and development. The short model cycles already common throughout the IT field today on an order of just months are having increased impact on the infotainment and assistance systems in automobile development. Thus, we in the automotive field also must adapt to substantially shortened model change cycles and/or upgradable solutions as well as introduce flexible development methods. A sensible technical solution here certainly lies in expanded modular design principles which enable highly diversified solutions by means of software. Flexible, adaptive and test-based methods of model-based development will thereby be of assistance.

With respect to the purely technical aspects, certainly CO2 legislation represents the most significant technology driver. Future CO2 and/or consumption fleet limits are converging worldwide into continually reducing levels. This requires on the one hand complex drive systems with ultra-flexible components, on the other, however, also calls for increased individualized adapting to the most diverse boundary conditions and results in multi-dimensional diversification of drive systems (different energy sources, different degrees of electrification, variant diversity, etc.).

In the future, integration of the powertrain into the entire relevant vehicle environment ("connected powertrain") will additionally allow optimum adapting of operating strategies to actual traffic and environmental conditions. The wealth of information from vehicle infotainment and assistance systems to C2X communication allows the precalculating of numerous scenarios and thus tremendously expands the optimization horizon. The various degrees of freedom of future drive systems can thus be used to a substantially greater extent to reduce energy consumption. However, this requires highly complex operating strategies with drastically increased development, calibration and above all validation expenditure.

In addition to the reliable control of such increasing drive system complexity, future RDE legislation represents a further, very crucial influence on development methodology. This is characterized by the expansion of the synthesized test cycle to randomized actual operation with a bewildering range of different driving states and boundary conditions.

From the customer's perspective, however, real-world driving encompasses substantially more than just RDE:

Positive driving experience—Driveability/Comfort/Agility/Operability

Absolute functional safety

Highest efficiency/minimum consumption

Confidence in driver assistance systems

High reliability/durability

2. Driving Element-Oriented Approach in the Development Process

The transition from precise testing reproducibility with clearly defined cycles and fixed evaluation variables to real-world driving evaluations with statistical randomness as well as consideration of subjectively perceived driving experiences represents a substantial upheaval and thereby necessitates both new developmental approaches as well as new development environments. The substantial fundamental requirements thereby are:

The objectification of subjective variables (e.g. driving experience): In terms of the objectification of subjectively perceived noise and driveability, AVL has been gathering practical experience for many decades and developing the corresponding developmental tools—thus, for example AVL-DRIVE [2] is well on its way to becoming a widely accepted tool for evaluating driveability.

Reliably reproducible determination of complex stochastically influenced characteristic values (e.g. real-drive emission): Subdividing such complex driving profiles into reproducible and assessable segments—the driving elements—categorizing them and statistically factoring in the influence on the integral characteristic value is a highly practicable approach. This can be seen analogously to the discretization of other task definitions such as e.g. fatigue analyses or process simulation. The value of these elements is thereby dictated by the demand for reproducible evaluability. Subjective human perceptions hereby also become the reference for other evaluation parameters such as consumption, emissions, etc.

However, the truly crucial step is the ability to identify those single elements from the plurality of single elements which have significant relevance for the overall result.

AVL has successfully used such a method for years within the realm of driveability development (AVL-DRIVE). A random real-world driving profile is thereby divided into defined single elements which are then allocated to approximately 100 individual categories and separately evaluated and statistically assessed according to approximately 400 specific evaluation criteria.

With comparably few adjustments, this method of using categorizable driving segments can be employed not only for evaluating driveability and noise level under actual conditions, but also for emissions, efficiency and subsequently also lateral dynamic variables all the way up to the evaluation of driving assistance systems [3].

In assessing the results of real-world measurements, it becomes evident that while there are single driving elements which are relevant to the overall evaluation only in terms of one optimization variable, as a general rule, the same driving elements are material to emission, efficiency, driveability and noise level. The conflicting objectives within a single driving element must then be resolved by means of these interdependences.

An intelligent "event finder" can thereby reliably identify "bottlenecks." Identification of these "events"—thus of result-relevant driving elements—requires online specification of corresponding target values for these driving elements and comparison to the actual values measured in each case. The target values for the individual evaluation variables are thereby generated in different ways:

Efficiency: The online target value calculation is realized in a complete vehicle model synchronized to the vehicle measurements based on the measured vehicle lateral dynamics and a factoring in of the current topography as well as other driving resistances. The vehicle model not only contains the entire hardware configuration but also the corresponding operating strategies. A balancing of all energy flows and energy stores is of course thereby necessary.

Emissions: In principle, the target value specification could be realized analogously to the "Efficiency" evaluation variable. With respect to the forthcoming RDE legislation, however, it makes more sense to effect the evaluation pursuant to the RDE regulations to be stipulated in the future legislation.

Driveability: Target value specification here is realized on the basis of objectified subjective driving perceptions and the specifying of a desired vehicle characteristic pursuant to AVL-DRIVE-developed classifications [2]. To objectify subjective driving perceptions, human perceptions via neural networks thereby need to be repeatedly correlated with physically measurable variables.

NVH: Similarly to the driveability, target value specification here is effected on the basis of the objectified subjective perception of noise and specification of the desired acoustic characteristics (e.g. AVL-VOICE [4]).

For evaluating the level of development of a vehicle, however, of interest is not only a comparison to the typically generated ideal values and processes in the concept phase of overall development but also the positioning within a specific benchmark distribution range. This is particularly of significance for vehicle analyses in which the basic data necessary for target value calculation is not complete. So as to ensure sufficient statistical relevance of current benchmark data (real-drive maneuver library), AVL conducted, e.g. just in 2014 alone, approximately 150 benchmark tests on the respectively most current vehicles.

The actual optimization results from incorporating the single result-relevant events into the respectively best-suited development environment. For single events primarily relating to only one evaluation variable, the optimization takes place in many cases directly in the vehicle in direct interaction with an automated online evaluation (e.g. compensating specific driveability failings).

For those single events in which there are pronounced conflicting objective relationships between the different evaluation variables (e.g. efficiency, emissions, driveability, etc.), it is expedient to reproduce the relevant single events on the XiL, motor and/or powertrain test bed. The reproducible operation here allows efficient single driving element development, whereby there is not only an isolated optimization of a single variable but rather an optimizing of the trade-offs (typically emission/efficiency/driveability/noise). In addition, given a concurrently running complete vehicle model, the effects on the entire "vehicle" system can also be directly assessed. Moreover, the comparison to a "real-drive maneuver library" (benchmark data) allows detailed classification in the competitive environment. This direct assessability enables a fast and accurate response and thus a greater degree of process flexibility.

The driving element consideration based on an intelligent event finder allows both efficient calibration capability as well as also an accurate virtual identification of optimally adapted drive architectures. This also enables the generating of a refined developmental topography map in which the relevant developmental tasks (both technical as well as subjective variables) are marked.

The availability of a comprehensive maneuver database with corresponding statistics on result-relevant single events as well as a segmented consideration of relevant driving profiles is thus essential not only in the calibration process but also during the early conceptual phase of powertrain development to accurately address important result-relevant task definitions.

3. Simultaneous Control of Developmental Procedures on Multiple Development Levels In addition to segmenting complex driving profiles into small, assessable single elements (vertical segmenting), categorizing the system integration of the complete vehicle into different system and component levels (horizontal categorization) is also a reliable basis for efficient development processes.

The vehicle-internal data and regulatory network/environment integration ("connected powertrain") results in an additional superordinate system level, the "traffic level."

The segmenting of driving profiles originally began at the vehicle module level with the optimizing of the longitudinal dynamics behavior of the powertrain (driveability optimization) and was then broken down to the level of the individual powertrain modules (e.g. engine, transmission, etc.).

However, a comprehensive acoustic and comfort evaluation already requires segmenting to the vehicle level. Operating at the vehicle level is also necessary in the development of the lateral dynamics-relevant functions (such as e.g. chassis tuning through to stability control [5]).

For the objectified evaluation of driver assistance systems (ADAS—Advanced Driver Assistance Systems), all the relevant environmental information needs to be integrated and thus the highest system level ("traffic level") included.

Basically similar requirements with respect to the segmenting of complex driving profiles and the objectification of subjective variables are also applicable to most optimizations on the vehicle or traffic level. The tools already employed in the evaluation of the powertrain longitudinal dynamics can thereby also be used for the optimization of lateral dynamics functions [2]. Since, however, the segmentation of the driving profiles differ for longitudinal and lateral dynamic aspects (with the exception of the stability control), there are few trade-off relationships, a further separate treatment of longitudinal and lateral dynamic tasks with respect to controllable developmental complexity seems to be expedient at present. In contrast, there are already comprehensively optimized longitudinal and lateral dynamic task definitions in motorsport racing today.

Although the essential subsystems at the vehicle module level (e.g. powertrain, body and chassis, electrics and electronics) are developed alongside their own processes, the overall vehicle development process is the dominant reference variable for all the other system developments. The overall vehicle development thus synchronizes all individual developmental tasks and also controls the structure of software and hardware integration levels (concept and prototype vehicles) with predefined functions. Complicating matters, however, is the fact that the developmental processes of the individual subsystems generally adhere to different time frames.

Hence, the common synchronization points within the overall vehicle development process (integration levels 1 to X) not only require working on a solely virtual or a solely real basis but also increasingly in mixed virtual/real development environments.

A key to controlling the complexity of the drive concepts of today and of the future is the early functional integration of the subsystems into an overall complete system perhaps provided in its entirety, partially or even only virtually. Today's well-established, purely actual integration level process (with actual hardware and software) will also be expanded in the future in line with front-loading to earlier development phases in purely virtual and combined virtual/real development environments.

Developments at the module or component level can thus then also be analyzed and developed in a total-vehicle context in the absence of complete vehicle prototypes. Complex interrelationships can thereby be evaluated and controlled in purely virtual or combined virtual/real developmental environments at an early stage and thereby facilitate the transition from digital mockup (DMU) to functional mockup (FMU).

Although the final validation of the functions will continue to occur in the vehicle, increased front-loading will also thereby be employed. With the new possibilities of a combined virtual/real development process, the steep rise in the number of development subtasks cannot only be efficiently managed but already initiated in the earlier development phases. Only by so doing will the complexity of drive development even be able to be controlled at all in the future.

Hence, over the entire development process, it is necessary to have an evaluation from the perspective of the overall vehicle subject to the relevant operating conditions (driver+ road+environment). Virtual and real-world testing is therefore coupled by way of a parallel complete vehicle model.

Both the functional development as well as also the validation of the combustion engine are run on stationary and dynamic engine test beds. The development of engine control and corresponding software functionalities including diagnostic functions is most appropriately transferred to XiL test rigs. The parallel virtual complete vehicle model (entire vehicle) with driving resistances, structure, axles, suspension, steering, braking system allows a continuous evaluation for achieving objectives in terms of vehicle consumption, emission and dynamics.

Particularly for the tuning, calibrating and validating of hybrid functions, the provision of combustion engine, transmission and electric motor hardware on the powertrain test bed constitutes a most efficient development environment. On the other hand, all the development tasks not requiring the full powertrain hardware (e.g. development/calibration of diagnostic functions) are processed in parallel in an XiL environment.

Depending on the task definition and available vehicle hardware, testing is run on the powertrain test bed with or without vehicle, on the rolling test rig as well as on the road in assembly carriers or in the vehicle prototype respectively. Since test conditions (driver, distance, load, wind, altitude, climate, etc.) as well as the parameters of the complete vehicle (driving resistances, structure, axles, suspension, steering, etc.—variant simulations) can change relatively rapidly on the powertrain test bed, it is often advantageous to increase both the development as well as the validation of complex systems (e.g. a completely new hybrid system) on the powertrain test bed even when the entire hardware including vehicle is available.

The allocating of tasks to the respectively best-suited development environment is gaining great important particularly in the field of validation. The combination of dramatically increasing system complexity and shortened development times requires intensified front-loading not only for the functional development but in particular also for the functional validation. Complete system validation is thereby no longer exclusively hardware-based but rather occurs in widely diverse combinations of real and virtual components in mixed virtual/real development environments (e.g. "virtual road on the test bed—virtual route—virtual driver").

An efficient and comprehensive validating of functional safety is crucial in the case of complex systems. The basis for the validation thereby represents a precisely generated collective of relevant test sequences which must provide feasible operational and misuse scenarios as well as comprehensive FMEAs (Failure Mode and Effects Analysis) by means of detailed system analysis, evaluation and classification. A high degree of systematization and automation thereby enables potentially critical operating states to be tested in substantially shorter time than of conventional road tests.

Pre-selecting these potentially critical states of course entails the risk of the test program only providing answers to explicitly posed questions while not addressing other points of risk. This risk will be lessened in the future by additional validating profiles generated from the maneuver database.

4. From DMU (Digital Mock-Up) to FMU (Functional Mock-Up) or from the "ToolChain" for the Traditional Development Procedure to the "ToolNetwork" for an Integral, Multi-Level Development Process In the actual development process, the parallelism of virtual, numerical component models and actually available hardware development stages already today require in many cases a "leap" between virtual and "real" experiments and will to a much greater degree in the future, whereby the "real" experiments of today in many cases already contain simulations. For flexible development, simulation and hardware have to mesh seamlessly and be interchangeable. In many cases, the development tool consistency required for that is not yet in place. The AVL-IODP (Integrated Open Development Platform) consistently displays this consistency throughout the entire development environment.

Substantial aspects of the systematic application of an integrated consistent development platform, which is moreover open to the most varied tools, are:

Consistent processes and methods allow a "front loading" of development tasks which to date have largely been performed for example in road tests, in earlier development phases, on the motor or powertrain test bed—in extreme cases, even in a purely virtual simulation environment (office simulation). Thus, an engine can for example be precalibrated in a combined real/virtual development environment with comparable quality of results substantially more rapidly than just by road testing alone.

Simulation model consistency: Situation models prepared in early development phases can also be reused in subsequent development phases and environments. These simulation models supplement (as virtual components) the hardware/development environments (i.e. test beds) by a mixed virtual/real development environment able to represent interactions at the complete vehicle level.

Consistent comparability of virtual and real tests by means of consistent data management and seamless model and method consistency. Results generated by means of simulation must on the one hand be consistent with the corresponding real-world tests and, on the other, also allow further development of the simulation models on the basis of the test results over the course of the development process. The feasibility of such continuous, consistent reconciliation between the virtual, real and combined virtual/real world is the prerequisite for a flexible modern development process.

Consistent model and test parameterization: Particularly during controller calibration, a plurality of input parameters such as e.g. environmental conditions, driving maneuvers, calibration data sets, etc. need to be managed. In order to be able to later compare the results between virtual and real testing, the input data sets also need to be comparably and consistently provided in the process.

Consistent embedding into existing process environments: It is of course necessary to be able to integrate continually new and/or improved development tools into existing processes and process environments. Such a development platform must therefore be open in the sense of, on the one hand, the integration of virtual, real and combined virtual/real tools and, on the other, the data management. The preferential aim is a "bottom-up approach" which also allows the integration of existing tools, thereby building upon existing know-how and well-established tools.

This IODP development platform is thus the basis for a consistent, model-based development process and broadens conventional toolchains into an integrated and consistent network: "From a sequential toolchain to a tool network." In this platform, virtual and real drive components can be integrated at the complete vehicle level at any time in the development process and the respectively suitable development environments configured. This tool network thus also represents a tool kit for the most flexible development process possible.

Consequently, integrating the development tools also requires an integrated evaluation platform in which the development result can be evaluated not only at the component and system level but also at the complete vehicle level on an ongoing basis.

Driveability evaluation with AVL-DRIVE has represented a first approach toward a comprehensive evaluation platform for many years now. The structure of this evaluation platform allows a consistent driveability evaluation to be conducted with all the relevant tools—from office simulation to real-world vehicle road test. The next expansion stages of AVL DRIVE-V 4.0 expand this evaluation platform by Emission evaluation pursuant to RDE legislative guidelines Efficiency evaluation with online ideal target value calculation including benchmark environment positioning Subjective noise perception evaluation This thus renders possible a consistent evaluation of the most essential evaluation parameters, from simulation to a motor/drive test bed and roller rig to the road test.

5. Outlook

The systematic continuation of these model-based development methods with driving element-based evaluation will in the future also enable selective development of Advanced Driver Assistance Systems (ADAS), automated driving as well as the "connected powertrain" in a "connected vehicle" network while still in a virtual environment and thus the efficient implementing of a comprehensive front-loading approach [2]. In enhancing the test bed and simulation structure, additional route, infrastructure, traffic objects and corresponding environmental sensors such as radar, lidar, ultrasonics, 2D and 3D cameras hereby need to be simulated on the powertrain test bed as complete vehicle and environment. So that map-based functions, for example such as for navigation system-based anticipatory energy management (e.g. e-Horizon) will function in the test bed booth, GPS signals of any position on earth can additionally be emulated and transmitted.

The depicted configuration ultimately allows the reproducible evaluating of functional safety, the correct functions as well as performance in terms of emission, consumption, mileage, safety and comfort characteristics in different driving maneuvers and traffic scenarios for the entire system as well as for the subjective driver perceptions.

Due to the rising complexity of the development tasks and the necessity in the future of having to manage comprehensive tool networks instead of toolchains, it will be increasingly difficult for the development engineer to make optimum use of all these tools and properly evaluate the responses and/or results from virtual and real tests and incorporate them into the further development. It will thus be necessary to also make the tools themselves even more "intelligent" as "Smart Cyber-Physical Systems." Such "intelligent" tools will better support the engineer in his work. These tools will know the test object's physical processes as well as the interrelationships between the development tasks and will thereby understand the measurement data; from automatic data plausibility to the efficient analysis and intelligent interpretation of large volumes of data. Nevertheless, these increasingly complex tasks in comprehensive development environments also require generic developer operation—the "networked development engineer"—who can, among other things, also move quickly between different system levels.

Literature:

[1] List, H. O.: "Künftige Antriebssysteme im rasch veränderlichen globalen Umfeld", 30th International Vienna Motor Symposium, May 7-8, 2009

[2] List, H.; Schoeggl, P.: "Objective Evaluation of Vehicle Driveability", SAE Technical Paper 980204, 1998, doi: 10.4271/980204

[3] Fischer, R; Küpper, K.; Schöggl, P.: "Antriebsoptimierung durch Fahrzeug-vernetzung", 35$^{th}$ International Vienna Motor Symposium, May 8-9, 2014

[4] Biermayer, W.; Thomann, S.; Brandl, F.: "A Software Tool for Noise Quality and Brand Sound Development", SAE 01NVC-138, Traverse City, Apr. 30-May 3, 2001

[5] Schrauf, M.; Schöggl, P.: "Objektivierung der Driveability von Automatisiertem/Autonomem Fahren", 2013 AVL Engine & Environment Conference, Sep. 5-6, 2013, Graz

[6] Hirose, T., Sugiura, T., Weck, T, Pfister, F.: "How To Achieve Real-Life Test Coverage Of Advanced 4-Wheel-Drive Hybrid Applications", CTI Berlin, 2013

LIST OF REFERENCE NUMERALS system 1
vehicle 2
drive device 3
first device 4
second device 5a, 5b, 5c, 5d
third device 6
first comparison device 7
allocation device 8
processing device 9
fourth device 10
second comparison device 11
output device 12
selection device 13
fifth device 14
energy storage device 15
steering actuator 16
steering control 17
wheel 18a, 18b, 18c, 18d
transmission 19
steering wheel input/steering wheel 20
differential 21
exhaust gas treatment 22
exhaust analysis device 23
exhaust system 24
data storage unit 25

The invention claimed is:

1. A system for analyzing an energy efficiency of a motor vehicle, comprising:
a first device, particularly a sensor, designed to acquire a first data set of at least one first parameter which is suited to characterizing an energy consumption of at least one apparatus, particularly a steering system or a powertrain;
a second device, particularly a sensor, designed to acquire a second data set of at least one second parameter which is suited to characterizing at least one operating state of the at least one apparatus;
a third device designed to acquire a third data set of at least one third parameter which is suited to characterizing at least one driving state of the vehicle;
a first comparison device, particularly part of a data processing device, designed to compare values of the second data set to predefined parameter ranges corresponding to at least one operating state and compare the values of the third data set to predefined parameter ranges corresponding to at least one driving state;
an allocation device, particularly part of a data processing device, designed to allocate the values of the first data set and the values of the second data set to the respectively present at least one driving state; and
a processing device, particularly part of a data processing device, designed to determine at least one first characteristic value characterizing at least the energy efficiency of the at least one apparatus on the basis of the first data set and the second data set as a function of the at least one driving state.

2. The system according to claim 1, wherein the at least one first parameter further characterizes an energy consumption of at least one further apparatus, that at least one second parameter further characterizes an operating state of the at least one further apparatus, and that the processing device is further designed to determine at least one second characteristic value characterizing at least the energy efficiency of the at least one further apparatus on the basis of the first data set and the second data set as a function of the at least one driving state and to consolidate the at least one first characteristic value characterizing at least the energy efficiency of the at least one apparatus with the at least one second characteristic value characterizing at least the energy efficiency of the at least one further apparatus for the respectively same driving state into one collective total characteristic value characterizing an energy efficiency of the system of the at least two apparatus.

3. The system according to claim 1, wherein same further comprises:
a fourth device, particularly an interface, designed to acquire a target value for the at least one characteristic value, particularly on the basis of a vehicle model or a reference vehicle;
a second comparison device, particularly part of a data processing device, designed to compare the characteristic value to the target value for determining of an evaluation; and
an output device, particularly a display, designed to output the evaluation on the basis of the comparison.

4. The system according to claims 1, wherein same further comprises a storage device designed to store a succession of driving states and that the processing device is further designed to factor in the succession of driving states when determining the characteristic value.

5. The system according to claims 1, wherein the processing device is further designed to adjust an allocation of the values of the first data set and the second data set to the at least one predefined driving state so as to take into account signal propagation delay and/or elapsed time from at least one measuring medium for acquiring the respective data set to a sensor.

6. A method for the evaluation and/or optimization of an energy efficiency of a motor vehicle comprising the following procedural steps:
acquiring a first data set of at least one first parameter which is suited to characterizing an energy consumption of at least one apparatus,
particularly a steering system or a powertrain;
acquiring a second data set of at least one second parameter which is suited to characterizing at least one operating state of the at least one apparatus;
acquiring a third data set of at least one third parameter which is suited to characterizing at least one driving state of the vehicle;
comparing the values of the second data set to predefined parameter ranges corresponding to at least one operating state and the values of the third data set to predefined parameter ranges corresponding to at least one driving state;
allocating the values of the first data set and the values of the second data set to the respectively present at least one driving state; and determining at least one first characteristic value characterizing at least the energy efficiency of the at least one apparatus on the basis of the first data set and the second data set as a function of the at least one driving state.

7. The method according to claim 6, wherein same further comprises the following procedural steps:
acquiring a target value for the at least one characteristic value, particularly on the basis of a vehicle model or a reference vehicle;
comparing the characteristic value to the target value for the determining of an evaluation of an energy efficiency; and
outputting the evaluation of energy efficiency on the basis of the comparison of the characteristic value to the target value.

8. The method according to claim 6, wherein the at least one first parameter further characterizes an energy consumption of at least one further apparatus, that the at least one second parameter further characterizes an operating state of the at least one further apparatus, and that the method further comprises the following procedural steps:
determining at least one second characteristic value characterizing at least one energy efficiency of the at least one further apparatus on the basis of the first data set and the second data set as a function of the at least one driving state;
consolidating the at least one first characteristic value characterizing at least the energy efficiency of the at least one apparatus with the at least one second characteristic value characterizing at least the energy efficiency of the at least one further apparatus for the respectively same driving state into one total characteristic value characterizing an energy efficiency of the system of the at least two apparatus.

9. The method according to claim 8, wherein the total characteristic value characterizes the energy efficiency of a powertrain, a steering system or the entire vehicle.

10. The method according to claim 6, wherein the first data set further characterizes an energy consumption of at least one further apparatus, that the second data set further characterizes an operating state of the at least one further apparatus, wherein the at least one apparatus supplies energy to the at least one further apparatus, and that the method further comprises the procedural step:
adjusting the energy consumption of the at least one apparatus by the energy consumption of the at least one further apparatus.

11. The method according to claim 6, wherein the apparatus is the steering system or one of its components or structural elements respectively, and that a respective operating state of the steering system is particularly from at least the following group of operating states:
turning into curves, turning out of curves, constant steering angle, activated and deactivated state of a steering actuator, servo operation, manual operation, or also a combination of at least two of these operating states.

12. The method according to claim 6, wherein the apparatus is a drive devices or one of its components or structural elements respectively, and that a respective operating state of the drive device is particularly from at least the following group of operating states:
overrun operation, partial load operation, full-load operation, deactivated state, activated state, starting operation, no-load operation, or also a combination of at least two of these operating states.

13. The method according to claims 6, at least one second parameter is further suited to characterizing a topography of surroundings of the vehicle.

14. The method according to claim 6, wherein the at least one apparatus is a combustion engine or a fuel cell system and the first parameter indicates at least one emission of the combustion engine or fuel cell system.

15. The method according to claim 6, wherein procedural steps are continued until the third data set spans a plurality of different driving states.

16. The method according to claim 6, wherein same further comprises the following procedural step:
determining a succession of the driving state, wherein the succession of the driving states is taken into account in the determining of the characteristic value.

17. The method according to claims 6, wherein the values of the first data set and/or the second data set are integrated over a duration of the respective driving state.

18. The method according to claims 6, wherein the values from a plurality of third data sets for a same type of driving state are consolidated for the determining of the at least one characteristic value.

19. The method according to claim 6, wherein same further comprises the following procedural step:
adjusting an allocation of the values of the first data set and the second data set to the at least one predefined driving state so as to take into account signal propagation delay and/or elapsed time from at least one measuring medium for acquiring the respective data set to a sensor.

20. The method according to claim 7 further comprising the following procedural step:
defining an operating mode of the vehicle on which the evaluation additionally depends and which is selected particularly from the following group of operating modes:
efficiency-oriented operating mode, mileage-oriented operating mode, comfort-oriented operating mode, consumption-oriented operating mode, reduced-emission operating mode, driveability-oriented operating mode, NVH comfort level-optimized operating mode.

21. A computer program having commands which, when executed by a computer, prompt same to perform a method in accordance with claim 6.

22. A computer-readable storage medium on which a computer program in accordance with claim 21 is stored.

* * * * *